United States Patent
Okumura

(10) Patent No.: US 12,056,551 B2
(45) Date of Patent: Aug. 6, 2024

(54) DISPLAY SYSTEM AND DISPLAY METHOD

(71) Applicant: NEC Platforms, Ltd., Kawasaki (JP)

(72) Inventor: Fujio Okumura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 217 days.

(21) Appl. No.: 17/623,366

(22) PCT Filed: Jun. 8, 2020

(86) PCT No.: PCT/JP2020/022513
§ 371 (c)(1),
(2) Date: Dec. 28, 2021

(87) PCT Pub. No.: WO2021/005939
PCT Pub. Date: Jan. 14, 2021

(65) Prior Publication Data
US 2022/0374669 A1    Nov. 24, 2022

(30) Foreign Application Priority Data

Jul. 9, 2019 (JP) ................................. 2019-127564

(51) Int. Cl.
*G06K 7/14* (2006.01)
*G06K 19/07* (2006.01)

(52) U.S. Cl.
CPC ....... *G06K 19/0707* (2013.01); *G06K 7/1452* (2013.01)

(58) Field of Classification Search
CPC ......... G06K 19/0707; G06K 19/07705; G06K 7/1097; G06K 7/1439; G06K 7/1452; B65G 1/137
See application file for complete search history.

(56) References Cited

U.S. PATENT DOCUMENTS

2005/0116813 A1* 6/2005 Raskar ................. G06K 19/145
340/10.5
2019/0325281 A1* 10/2019 Motoshima ........ G06K 7/10079

FOREIGN PATENT DOCUMENTS

EP        3059697 A1 *  8/2016  ......... G06K 19/0704
JP    2005-291716 A    10/2005
(Continued)

OTHER PUBLICATIONS

International Search Report for PCT Application No. PCT/JP2020/022513, mailed on Sep. 8, 2020.
(Continued)

*Primary Examiner* — Thien M Le
*Assistant Examiner* — April A Taylor

(57) ABSTRACT

A display system includes a plurality of tags and a detection device. Each tag of the plurality of tags stores an identification code for identifying that tag, generates electric power upon receiving light that contains identification information to be compared with the identification code, and emits light using the electric power of that tag when the identification information contained in the received light matches the identification code. The detection device generates image data in accordance with an input of the identification information on a selected article, projects scanning light containing identification information on the position of the tag extracted from the generated image data, and, when emitted light from any of the plurality of tags is detected from the image data acquired during a period in which the scanning light is projected, projects marking light within a range attached with the tag that has emitted light.

10 Claims, 28 Drawing Sheets

(56) References Cited

FOREIGN PATENT DOCUMENTS

| | | |
|---|---|---|
| JP | 2006-121826 A | 5/2006 |
| JP | 2007-201914 A | 8/2007 |
| JP | 2009-012885 A | 1/2009 |
| JP | 2018-181283 A | 11/2018 |

OTHER PUBLICATIONS

English translation of Written opinion for PCT Application No. PCT/JP2020/022513, mailed on Sep. 8, 2020.

* cited by examiner

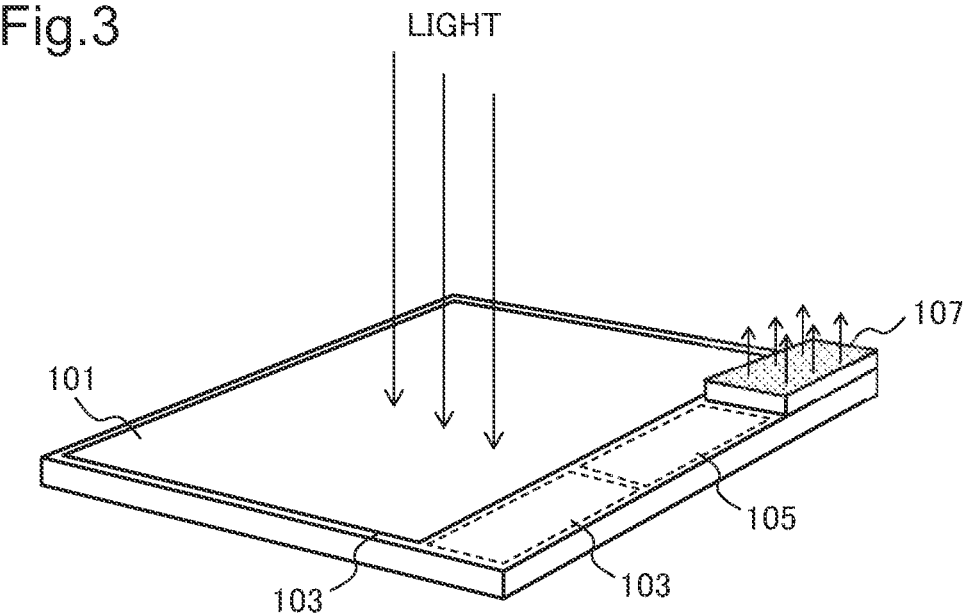
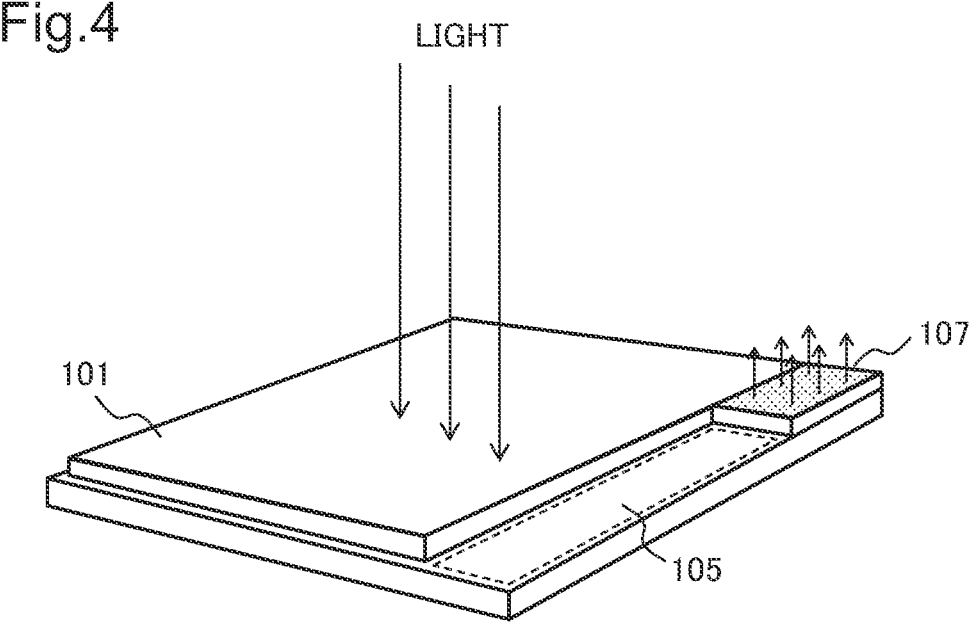

DISPLAY SYSTEM AND DISPLAY METHOD

This application is a National Stage Entry of PCT/JP2020/022513 filed on Jun. 8, 2020, which claims priority from Japanese Patent Application 2019-127564 filed on Jul. 9, 2019, the contents of all of which are incorporated herein by reference, in their entirety.

TECHNICAL FIELD

The present invention relates to a display system and a display method used for managing a stored article.

BACKGROUND ART

In libraries, warehouses, and the like, it is required to quickly and precisely find, from among many articles being stored (hereinafter, also referred to as a stored article), a stored article to be selected (hereinafter, also referred to as a selection article). In libraries or warehouses, when a stored article to be stored (hereinafter, also referred to as a storage article) is stored in a designated storage place, it is required to quickly and precisely find the storage place of the storage article. That is, in libraries, warehouses, and the like, it is required to quickly and precisely find a position of a target to be selected including a selection article and a storage place of a storage article.

PTL 1 discloses a tag device attached to plate-shaped stored articles stored in parallel. The tag device of PTL 1 includes: a reception unit that receives an external signal; a tag control unit that performs management operation on the basis of the external signal received by the reception unit; and a photovoltaic element that has a light receiving surface spreading in a planar shape, generates electric power by light received on the light receiving surface, and supplies the electric power to the tag control unit. In the photovoltaic element of PTL 1, the light receiving surface can be attached to a plate-shaped stored article in an oblique posture with respect to the stored article and in a posture facing outward in a state where the stored article is stored in a storage unit.

PTL 2 discloses a system that detects whether a target to be detected is present around a detection device using a detection tag provided on the target to be detected.

CITATION LIST

Patent Literature

[PTL 1] JP 2009-012885 A
[PTL 2] JP 2005-291716 A

SUMMARY OF INVENTION

Technical Problem

The tag device in PTL 1 can notify of a position of a stored article by causing a light emitting element to emit light using the electric power supplied by the electric power generation of the photovoltaic element. However, in a place such as a library where a large amount of stored articles are arranged, it is not always easy to visually recognize and find out a stored article by relying only on small light emission by the light emitting element installed on each stored article.

According to the system of PTL 2, the detection device can check the presence or absence of the target to be detected using the detection tag provided in the target to be detected. However, the system of PTL 2 cannot be used for a worker to visually recognize and find a target to be detected.

An object of the present invention is to provide a display system and the like capable of displaying a mark for quickly and precisely finding a target to be selected according to light emission of a tag attached to a stored article.

Solution to Problem

A display system according to an aspect of the present invention includes: a plurality of tags that each stores an identification code for identifying that tag, generates electric power upon receiving light that contains identification information to be compared with the identification code, and emits light using the electric power of that tag when the identification information contained in the received light matches the identification code; and a detection device that performs imaging and generates image data in accordance with an input of the identification information on a selected article, extracts at least one tag among the plurality of tags from the image data that has been generated, projects scanning light that contains identification information on the position of the at least one tag that has been extracted, and, when emitted light from any of the plurality of tags is detected from the image data acquired during a period in which the scanning light is projected, projects marking light within a range attached with the tag that has emitted light.

A display method according to an aspect of the present invention is a display method of displaying marking light around a plurality of tags, each of the tags being configured to store an identification code for identifying that tag, generate electric power upon receiving light that contains identification information to be compared with the identification code, and emit light using the electric power of that tag when the identification information contained in the received light matches the identification code, the method including: performing imaging and generating image data in accordance with an input of the identification information on a selected article; extracting at least one tag among the plurality of tags from the image data that has been generated; projecting scanning light that contains identification information on a position of the at least one tag that has been extracted; and, when emitted light from any of the plurality of tags is detected from the image data acquired during a period in which the scanning light is projected, projecting the marking light on the periphery of the tag that has emitted light.

Advantageous Effects of Invention

According to the present invention, it is possible to provide a display system and the like capable of displaying a mark for quickly and precisely finding a target to be selected according to light emission of a tag attached to a storage article.

BRIEF DESCRIPTION OF DRAWINGS

FIG. 3 is a conceptual diagram illustrating an appearance of an example of the tag included in the display system according to the first example embodiment of the present invention.

FIG. 4 is a conceptual diagram illustrating an appearance of another example of the tag included in the display system according to the first example embodiment of the present invention.

EXAMPLE EMBODIMENT

Figure 1:
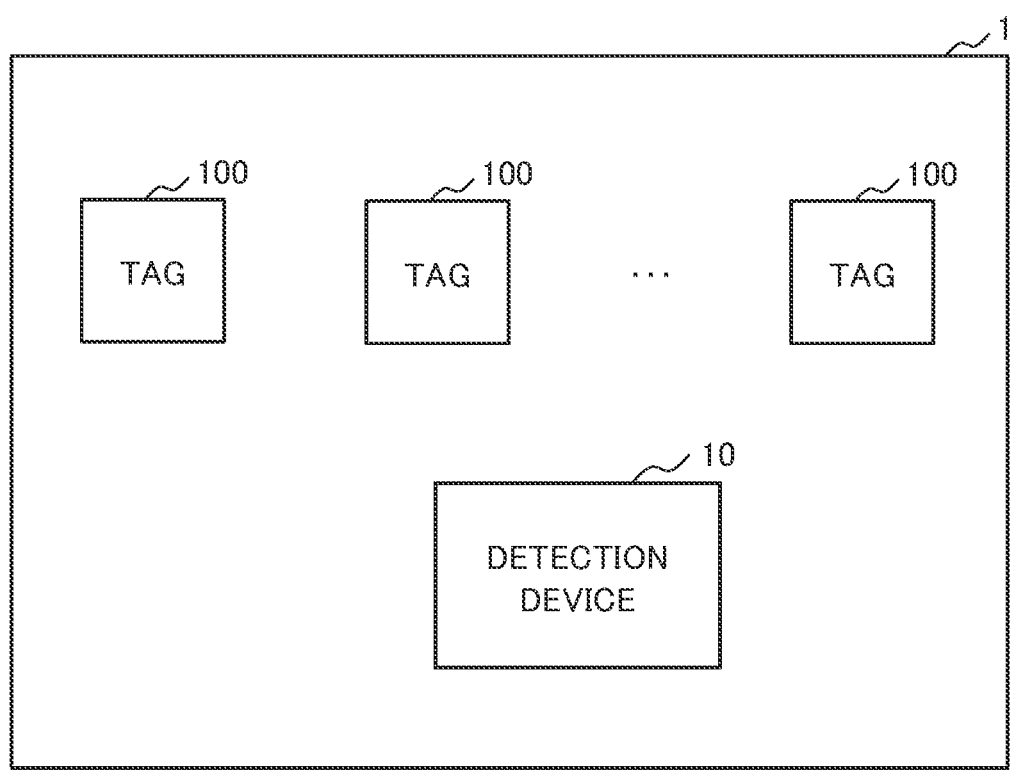
FIG. 1 is a block diagram illustrating an outline of a configuration of a display system according to a first example embodiment of the present invention.

Hereinafter, example embodiments of the present invention will be described with reference to the drawings. However, the example embodiments described below have technically preferable limitations for performing the present invention, but the scope of the invention is not limited to the following. In all the drawings used in the following description of the example embodiments, the same reference signs are given to the same parts unless there is a particular reason. In the following example embodiments, repeated description of similar configurations and operations may be omitted.

The direction of the arrow in the drawings indicates an example of the direction in which light or a signal travels, and does not limit the direction. The line indicating the traveling of light in the drawings is conceptual, and does not accurately indicate the actual state of the traveling direction of light. For example, in the drawings below, a change in a traveling direction or a state of light due to refraction, reflection, diffusion, or the like at an interface between air and a substance may be omitted, or a light flux may be expressed by one line.

First Example Embodiment

First, a display system according to a first example embodiment of the present invention will be described with reference to the drawings. The display system of the present example embodiment is a system that projects light (also referred to as marking light) serving as a mark for quickly and precisely picking up a desired article at a place where a plurality of articles are stored.

(Configuration)

FIG. 1 is a block diagram illustrating an outline of a configuration of a display system 1 of the present example embodiment. As illustrated in FIG. 1, the display system 1 includes a plurality of tags 100 and a detection device 10. As an example, the display system 1 is used for managing books stored in a library or articles stored in a warehouse (hereinafter, also referred to as a stored article). The display system 1 can be used to manage not only a stored article stored in a library or a warehouse but also an optional article. Configurations of the tag 100 and the detection device 10 will be individually described below.

[Tag]

Figure 2:
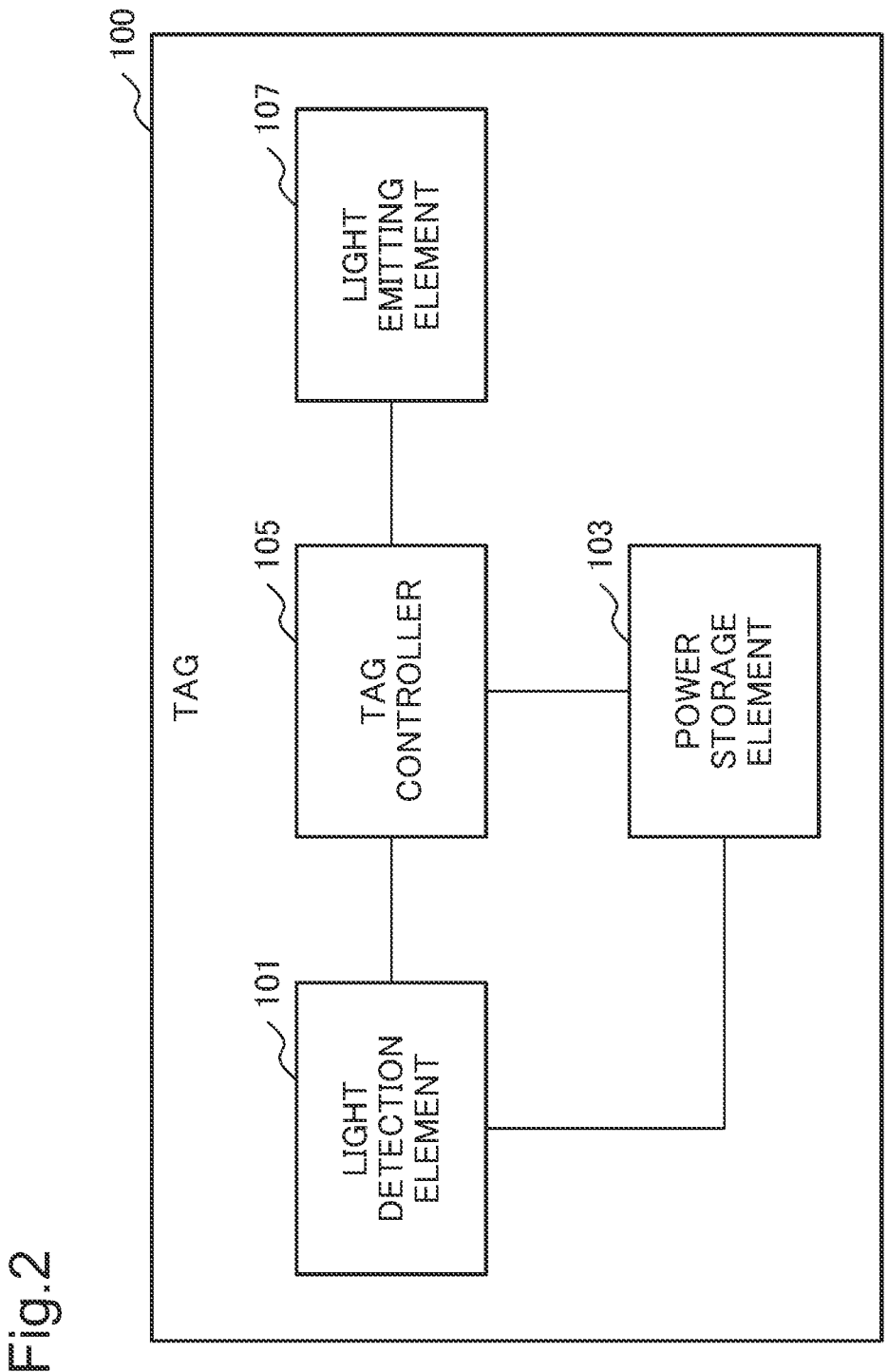
FIG. 2 is a block diagram illustrating an example of a configuration of a tag included in the display system according to the first example embodiment of the present invention.

FIG. 2 is a block diagram illustrating an example of a configuration of the tag 100 included in the display system 1. The tag 100 includes a light detection element 101, a power storage element 103, a tag controller 105, and a light emitting element 107. For example, the tag 100 is attached to a stored article stored in a library or a warehouse. Therefore, it is desirable that the tag 100 be set to a size relevant to the stored article to which the tag 100 is attached. For example, in the case of a book stored in a bookcase of a library, the tag 100 is attached to a spine of the book to manage the book.

The light detection element 101 is connected to the power storage element 103 and the tag controller 105. The light detection element 101 has a light receiving surface, and converts light emitted to the light receiving surface into electricity. The light detection element 101 outputs the converted electricity to the power storage element 103 and the tag controller 105. For example, the light detection element 101 is achieved by a solar cell or a photodiode.

The power storage element 103 is connected to the light detection element 101 and the tag controller 105. Electricity is supplied from the light detection element 101 to the power storage element 103. The power storage element 103 stores the supplied electricity. The power storage element 103 smooths the voltage of the stored electricity and supplies the electricity with the stabilized voltage to the tag controller 105. The electricity supplied from the power storage element 103 to the tag controller 105 is a direct current. For example, the power storage element 103 is achieved by combining a smoothing circuit and a capacitor.

The tag controller 105 is connected to the light detection element 101, the power storage element 103, and the light emitting element 107. The tag controller 105 is supplied with electric power from the power storage element 103. The tag controller 105 stores an identification code unique to each tag 100. As an example, the tag controller 105 is achieved by a microcomputer including at least a processor and a memory.

The tag controller 105 is started when sufficient electric power is supplied from the power storage element 103. When started, the tag controller 105 converts the waveform pattern of electricity supplied from the light detection element 101 into an electrical signal. The waveform pattern of electricity supplied from the light detection element 101 is according to an ON/OFF pattern of light received by the light detection element 101. The tag controller 105 decodes the converted electrical signal and extracts identification information included in the electrical signal. The tag controller 105 determines whether the extracted identification information matches the identification information stored therein. When the extracted identification information matches the identification information stored therein, the tag controller 105 supplies electric power to the light emitting element 107.

The light emitting element 107 is connected to the tag controller 105. The light emitting element 107 emits light by electric power supplied from the tag controller 105. For example, the light emitting element 107 is achieved by a light emitting element such as a micro light emitting diode (LED), an organic electro-luminescence (EL) element, or an inorganic EL element.

The light emitting element 107 emits light having a wavelength in the visible region or the near-infrared region. Since the electromotive force generated by the light detection element 101 is weak, the light emitting element 107 can emit light only for a very short time. Therefore, it is difficult to visually recognize the light emission of the light emitting element 107 with the naked eye. In the present example embodiment, with respect to image data obtained by performing high-speed imaging with the camera of the detection device 10, it is possible to increase the contrast with respect to the light emission of the light emitting element 107 or to find weak light by performing processing of obtaining a difference. It is sufficient that the light emitting element 107 emits light for a short time with intensity that can be detected by the detection device 10. Since the light emission of the light emitting element 107 may not be visually recognizable, the light emitting element 107 may be configured to emit light having a wavelength in the near-infrared region.

FIG. 3 is a conceptual diagram illustrating an appearance of an example of the tag 100 in which the light detection element 101, the power storage element 103, and the tag controller 105 are arranged inside a substrate. FIG. 3 conceptually illustrates a state in which the light emitting element 107 emits light according to the light received by the light receiving surface of the light detection element 101. The arrow indicating the light incident on the light detection element 101 and the arrow indicating the light by the light emission of the light emitting element 107 are conceptual, and do not limit the intensity and the traveling direction of the light. In the structure of FIG. 3, since the light receiving surface of the light detection element 101 does not protrude from the upper surface of the substrate, the overall thickness can be reduced.

FIG. 4 is a conceptual diagram illustrating an example of an appearance of the tag 100 in which the light detection element 101 and the power storage element 103 are configured inside the substrate, and the tag controller 105 is arranged on the upper surface of the substrate. In the example of FIG. 4, a state in which the light emitting element 107 emits light according to the light received by the light receiving surface of the light detection element 101 is illustrated. The arrow indicating the light incident on the light detection element 101 and the arrow indicating the light by the light emission of the light emitting element 107 are conceptual, and do not limit the intensity and the traveling direction of the light. In the structure of FIG. 4, the light detection element 101 can be arranged on the upper surface of the substrate, and the power storage element 103 (not illustrated) can be arranged below the light detection element 101. Therefore, although the structure of FIG. 4 is thicker than the structure of FIG. 3, the capacity of the power storage element 103 can be increased.

The configuration of the tag 100 has been described above. The configuration of FIGS. 2 to 4 is an example, and the configuration of the tag 100 is not limited to the original form.

[Detection Device]

Figure 5:
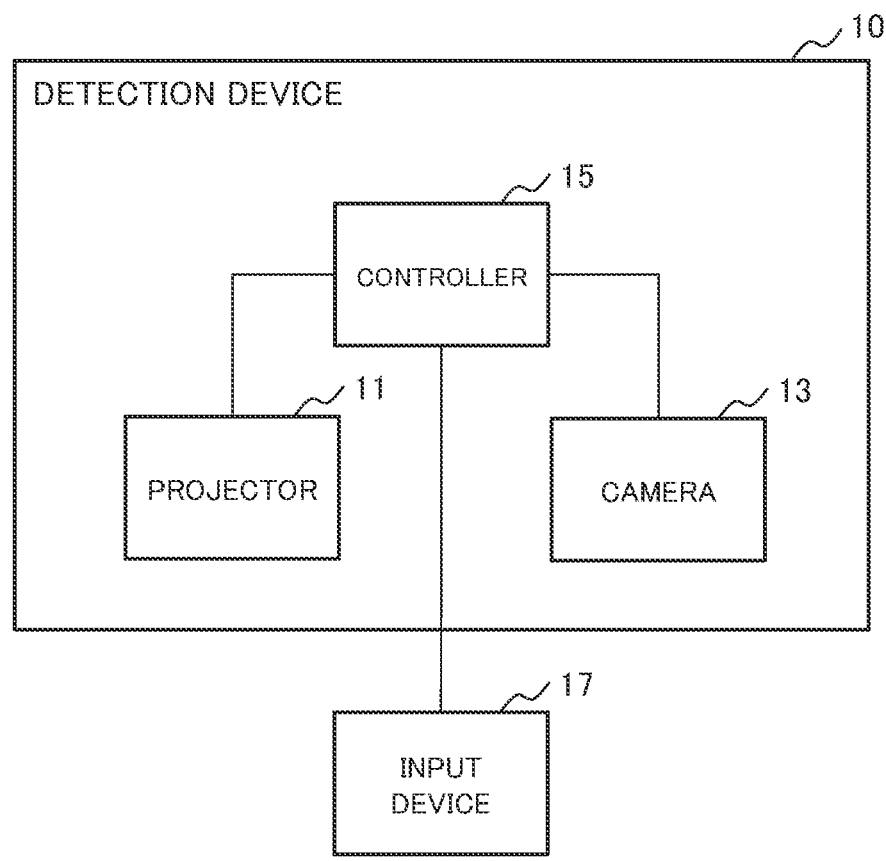
FIG. 5 is a block diagram illustrating an example of a configuration of a detection device included in the display system according to the first example embodiment of the present invention.
Figure 6:
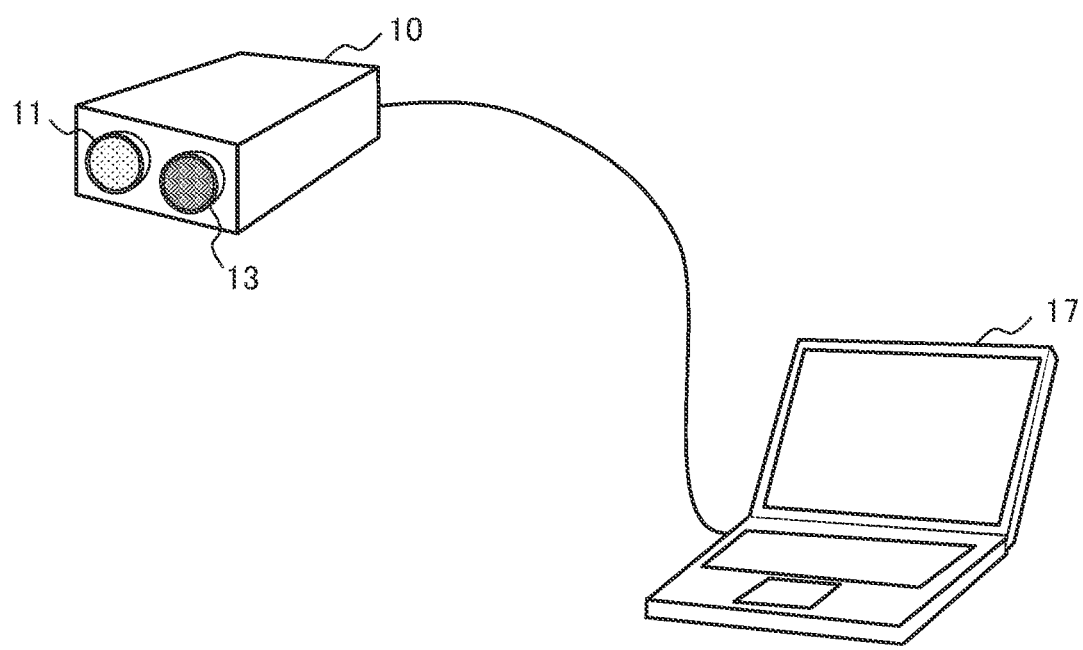
FIG. 6 is a conceptual diagram illustrating an example of an appearance of the detection device included in the display system of the first example embodiment of the present invention.

FIG. 5 is a block diagram illustrating an example of a configuration of the detection device 10 included in the display system 1. FIG. 6 is a conceptual diagram illustrating an example of an appearance of the detection device 10. The detection device 10 includes a projector 11, a camera 13, and a controller 15. In the examples of FIGS. 5 and 6, the controller 15 is connected to the input device 17. In the examples of FIGS. 5 and 6, the controller 15 and the input device 17 are connected by wire, but the controller 15 and the input device 17 may be wirelessly connected. The input device 17 may be included in the configuration of the detection device 10 or may not be included in the configuration of the detection device 10.

For example, the display system 1 is used for detecting a desired book in a library. For example, when a desired book is detected in a library, the display system 1 performs situation recognition by recognizing a bookcase from among images captured by the camera 13. At this stage, the purpose is not to detect the book, but to specify the bookcase in which the book is stored. The display system 1 continues to irradiate the tag 100 whose light emission has been detected with light (also referred to as scanning light) while irradiating the tag 100 with the scanning light so as to scan the position of the tag 100 attached to the book arranged on the specified shelf of the bookcase. When there is a plurality of books to be selected, the display system 1 continues to irradiate the plurality of tags 100 with scanning light. The display system 1 irradiates the book to which the tag 100 is attached with marking light while detecting the light emission of the tag 100 continuously irradiated with the scanning light.

The projector 11 is connected to the controller 15. The projector 11 projects projection light according to the control of the controller 15. In a case where the tag 100 attached to the stored article to be picked up is caused to emit light, the projector 11 projects projection light 170 that causes scanning light including an identification signal relevant to the identification code stored in the tag 100 to be displayed. When receiving a response from the tag 100, the projector 11 projects projection light 170 for displaying the marking light on the surface of the stored article to which the tag 100 is attached. The scanning light may not be light having a wavelength in the visible region, but the marking light is light having a wavelength in the visible region.

The camera 13 is connected to the controller 15. The camera 13 performs imaging under the control of controller 15. It is sufficient that the camera 13 has a function of a general digital camera. However, when light having a wavelength in the infrared region is used for scanning light, a function of an infrared camera capable of capturing light having a wavelength in the infrared region is added to the camera 13.

The controller 15 is connected to the projector 11 and the camera 13. The controller 15 controls the projector 11 to project projection light. The controller 15 controls the camera 13 to perform imaging. As an example, the controller 15 is achieved by a microcomputer including at least a processor and a memory.

Configurations of the projector 11, the camera 13, and the controller 15 will be individually described below.

[Projection Device]

Figure 7:
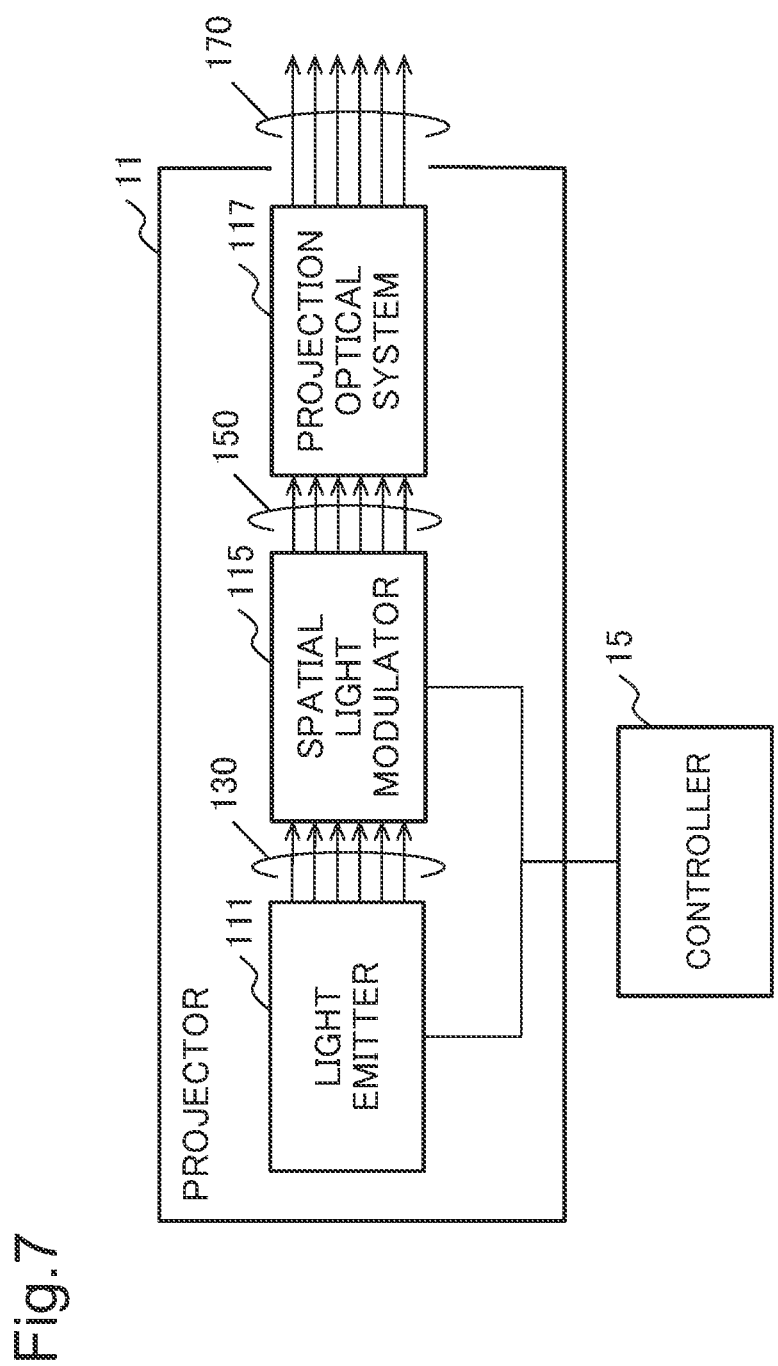
FIG. 7 is a block diagram illustrating an example of a configuration of a projector included in the detection device included in the display system according to the first example embodiment of the present invention.

FIG. 7 is a block diagram illustrating a configuration of the projector 11. As illustrated in FIG. 7, the projector 11 includes a light emitter 111, a spatial light modulator 115, and a projection optical system 117. Note that FIG. 7 is conceptual, and does not accurately represent the positional relationship between the components, the light irradiation direction, and the like.

As illustrated in FIG. 7, the light emitter 111 is connected to the controller 15. The light emitter 111 emits parallel light 130 having a specific wavelength according to the control of the controller 15. For example, a laser light source can be used as the light emitter 111. The light emitter 111 may be configured to emit light having a wavelength in the visible region, or may be configured to emit light having a wavelength other than the visible region such as the infrared region or the ultraviolet region. The light emitter 111 may emit light other than laser light, such as a light emitting diode, an incandescent bulb, or a discharge tube.

Figure 8:
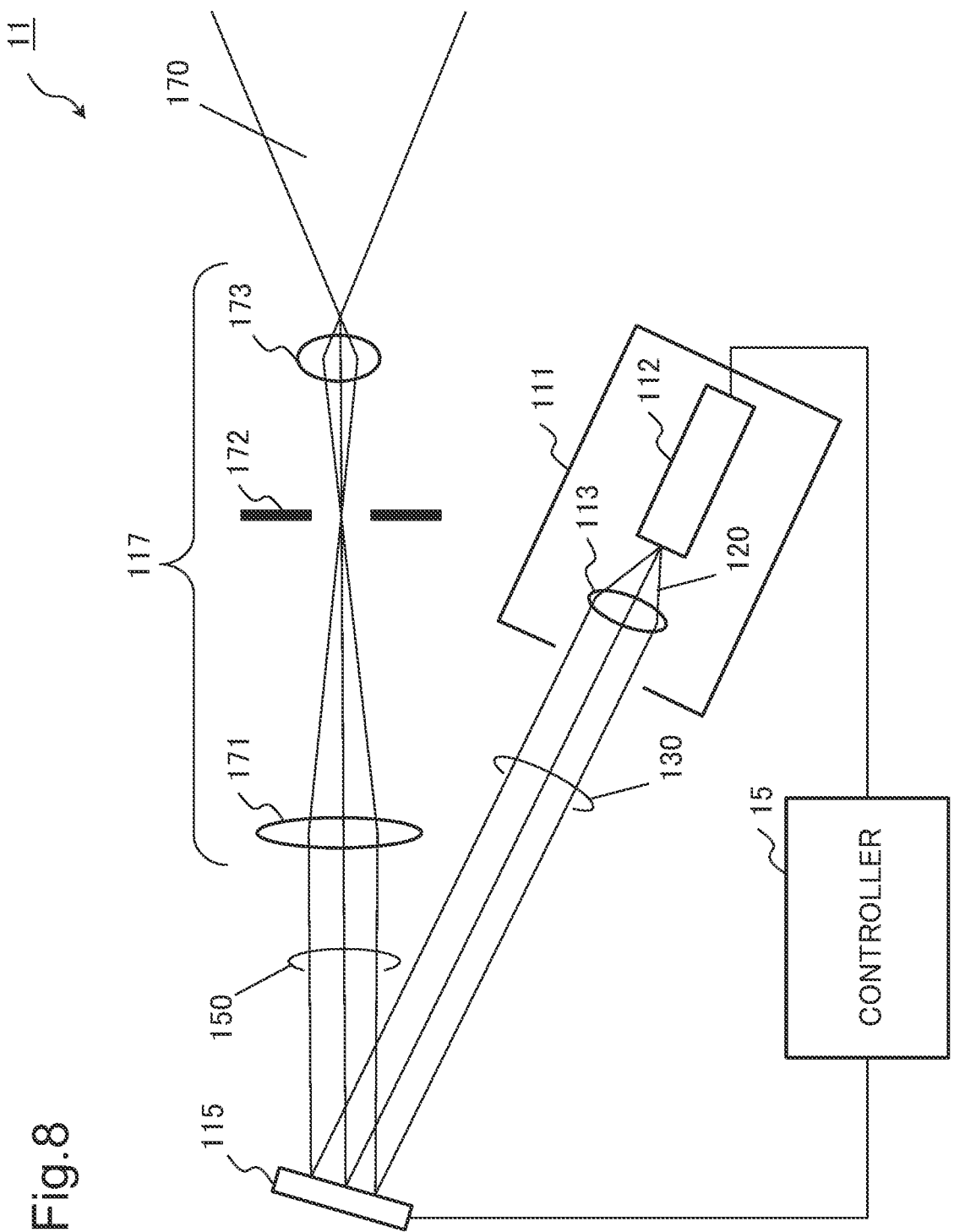
FIG. 8 is a conceptual diagram illustrating an example of a configuration of the projector included in the detection device included in the display system according to the first example embodiment of the present invention.

FIG. 8 is a schematic diagram for explaining an optical system of the projector 11. As illustrated in FIG. 8, the light emitter 111 includes a light source 112 that emits light 120 having a specific wavelength, and a collimator 113 that converts the light 120 emitted from the light source 112 into parallel light 130. The light 120 emitted from the light source 112 is converted into the parallel light 130 by the collimator 113 and is incident on the surface of the display surface of the spatial light modulator 115.

As illustrated in FIG. 8, in the present example embodiment, the incident angle of the parallel light 130 is made non-perpendicular to the display surface of the spatial light modulator 115. That is, in the present example embodiment, the emission axis of the parallel light 130 emitted from the light emitter 111 is inclined with respect to the display surface of the spatial light modulator 115. If the emission axis of the parallel light 130 is set obliquely with respect to the display surface of the spatial light modulator 115, the parallel light 130 can be incident on the display surface of the spatial light modulator 115 without using a beam splitter, so that utilization efficiency of light can be improved. If the emission axis of the parallel light 130 is set obliquely with respect to the display surface of the spatial light modulator 115, the size of the optical system of the projector 11 can be made compact.

As illustrated in FIG. 7, the spatial light modulator 115 is connected to the controller 15. The spatial light modulator 115 has a display surface on which a pattern for displaying a desired image on the projection surface is displayed. The spatial light modulator 115 displays, on the display surface, a pattern for displaying a desired image on the projection surface according to the control of the controller 15. As illustrated in FIG. 8, in the present example embodiment, in a state where a pattern for displaying a desired image is displayed on the display surface of the spatial light modulator 115, the display surface is irradiated with the parallel light 130. Reflected light (modulated light 150) of the parallel light 130 with which the display surface of the spatial light modulator 115 is irradiated travels toward the projection optical system 117.

On the display surface of the spatial light modulator 115, a plurality of reflection regions (relevant to pixels) capable of changing optical characteristics such as a refractive index are arrayed in an array. The spatial light modulator 115 can display, on the display surface, a pattern for displaying a desired image on the projection surface by controlling the optical characteristics of each pixel on the display surface. When light is emitted in a state where a pattern is displayed on the display surface of the spatial light modulator 115, modulated light in which a spatial distribution is modulated according to an optical characteristic of the reflection surface is emitted. For example, a modulator that modulates a spatial distribution such as a phase, an amplitude, an intensity, a polarization state, a propagation direction, and the like of light can be used as the spatial light modulator 115.

For example, the spatial light modulator 115 can be achieved by a phase modulation type spatial light modulator that modulates the phase of the incident parallel light 130. Since the phase modulation type spatial light modulator 115 is focus-free, it is not necessary to change the focus for each distance even if light is projected on the display area set at a plurality of projection distances. An example of using the phase modulation type spatial light modulator 115 will be described below.

On the display surface of the phase modulation type spatial light modulator 115, a phase image relevant to the image to be displayed on the projection surface is displayed. The phase image is a pattern in which a phase distribution relevant to an image to be displayed on the projection surface is arranged in a tile shape. In this case, the modulated light 150 reflected in the display region of the spatial light modulator 115 becomes an image in which a type of diffraction grating forms an aggregate, and the image is formed such that light diffracted by the diffraction grating gathers.

For example, the spatial light modulator 115 is achieved by a spatial light modulator using ferroelectric liquid crystal, homogeneous liquid crystal, vertical alignment liquid crystal, or the like. Specifically, the spatial light modulator 115 can be achieved by liquid crystal on silicon (LCOS). The spatial light modulator 115 may be achieved by a micro electro mechanical system (MEMS).

By using the phase modulation type spatial light modulator 115, energy can be concentrated on a portion of a line constituting an image by sequentially switching a region where projection light is projected. Therefore, when the phase modulation type spatial light modulator 115 is used, if the outputs of the light sources are the same, it is possible to display an image brighter than a method of projecting light onto the entire display region.

The projection optical system 117 is an optical system that projects the modulated light 150 obtained as a result of modulation by the spatial light modulator 115 as projection light 170. The modulated light 150 emitted from the spatial light modulator 115 is projected as projection light 170 by the projection optical system 117. As illustrated in FIG. 8, the projection optical system 117 includes a Fourier transform lens 171, an aperture 172, and a projection lens 173.

The Fourier transform lens 171 is an optical lens that forms an image formed when the reflected light (modulated light 150) reflected by the display surface of the spatial light modulator 115 is projected at infinity, at a near focal position. In the example of FIG. 8, a focal point is formed at the position of the aperture 172.

The aperture 172 has a function of shielding high-order light included in the light focused by the Fourier transform lens 171 and specifying a display region. The opening of the aperture 172 is opened smaller than the outer periphery of the display region at the position of the aperture 172, and is installed so as to shield the peripheral region of the image at the position of the aperture 172. For example, the opening of the aperture 172 is formed in a rectangular shape or a circular shape. The aperture 172 is preferably provided at the focal position of the Fourier transform lens 171, but may be shifted from the focal position as long as a function of erasing high-order light can be exhibited.

The projection lens 173 is an optical lens that enlarges and projects the light focused by the Fourier transform lens 171. The projection lens 173 projects the projection light 170 such that an image relevant to the phase distribution displayed on the display surface of the spatial light modulator 115 is formed on the projection surface.

Figure 9:
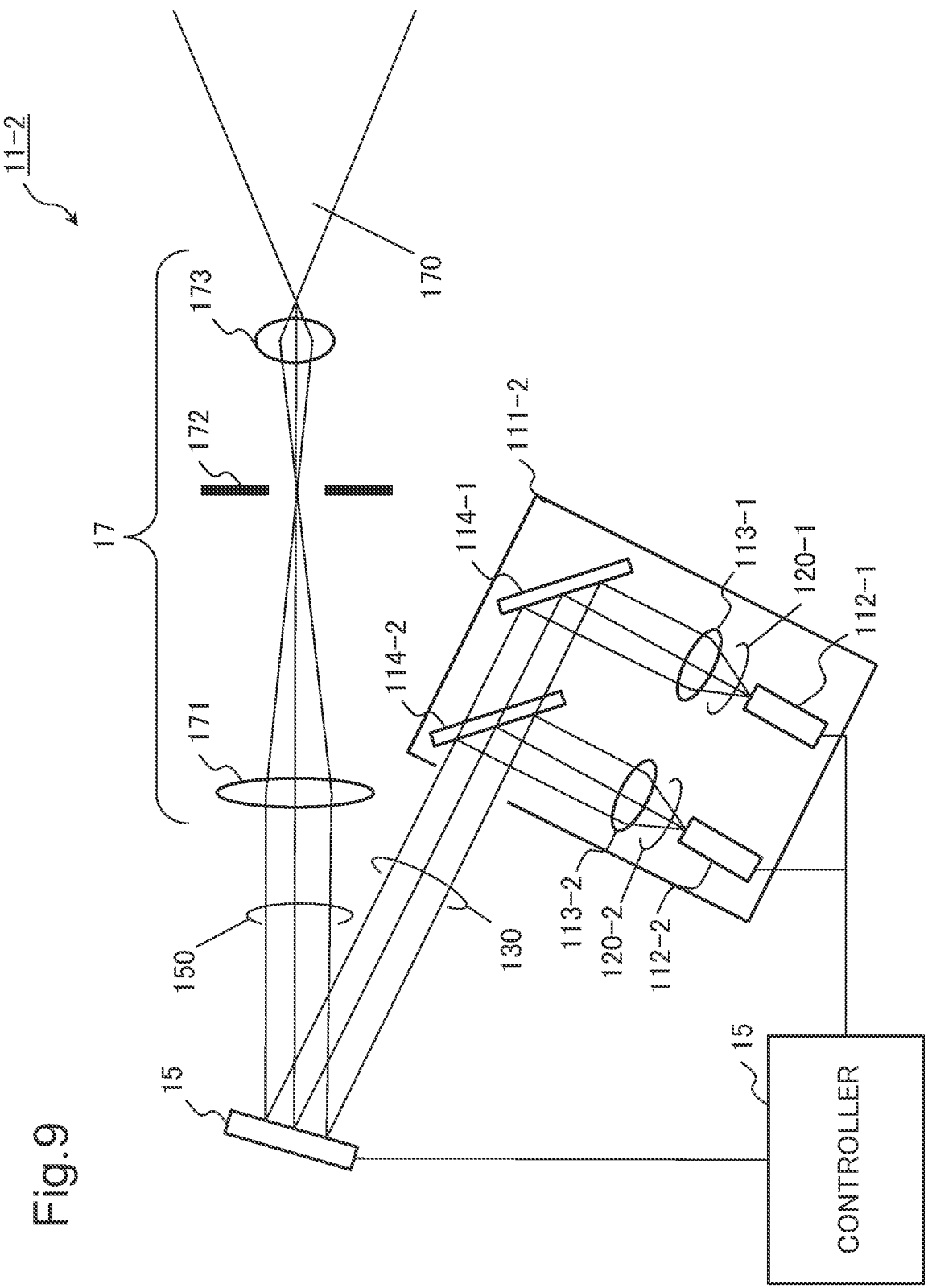
FIG. 9 is a conceptual diagram illustrating another example of the configuration of the projector included in the detection device included in the display system of the first example embodiment of the present invention.

Here, a configuration in a case where light of a plurality of wavelength regions is projected from the projector 11 will be described with reference to the drawings. FIG. 9 is a conceptual diagram illustrating a configuration example of a projection device 11-2 that projects light of a plurality of wavelength regions. The projection device 11-2 in FIG. 9 includes a light emitter 111-2 that emits light of a plurality of wavelength regions. The light emitter 111-2 includes a light source 112-1, a collimator 113-1, a mirror 114-1, a light source 112-2, a collimator 113-2, and a dichroic mirror 114-2. Although FIG. 9 illustrates an example in which light of two colors is emitted using two light sources (light source 112-1, light source 112-2), light of three or more colors may be emitted using three or more light sources.

The light source 112-1 emits light 120-1 in a first wavelength region. The light 120-1 emitted from the light source 112-1 passes through the collimator 113-1 and becomes coherent light. The light having passed through the collimator 113-1 is reflected by the reflection surface of the mirror 114-1 and travels toward the dichroic mirror 114-2. The light 130 having passed through the dichroic mirror 114-2 travels toward the display surface of the spatial light modulator 115.

The light source 112-2 emits light 120-2 in a second wavelength region. The light 120-2 emitted from the light source 112-2 passes through the collimator 113-2 and becomes coherent light. The light having passed through the collimator 113-2 is reflected by the reflection surface of the dichroic mirror 114-2. The light 130 reflected by the reflection surface of the dichroic mirror 114-2 travels toward the display surface of the spatial light modulator 115.

The light emitter 111-2 emits light 130 emitted from at least one of the light source 112-1 and the light source 112-2 toward the display surface of the spatial light modulator 115. For example, the light emitter 111-2 emits light switching between the light of the first wavelength region from the light source 112-1 and the light of the second wavelength region from the light source 112-2 according to the control of the controller 15. The light emitter 111-2 may be configured to simultaneously emit the light of the first wavelength region from the light source 112-1 and the light of the second wavelength region from the light source 112-2.

According to the configuration of FIG. 9, images of different colors can be displayed. For example, light having a wavelength in the near-infrared region can be projected as scanning light, and light having a wavelength in the visible region can be projected as marking light.

The configuration of the projector 11 has been described above. The configurations of FIGS. 7 to 9 are examples, and the configuration of the projector 11 is not limited to the original form.

[Imaging Device]

Figure 10:
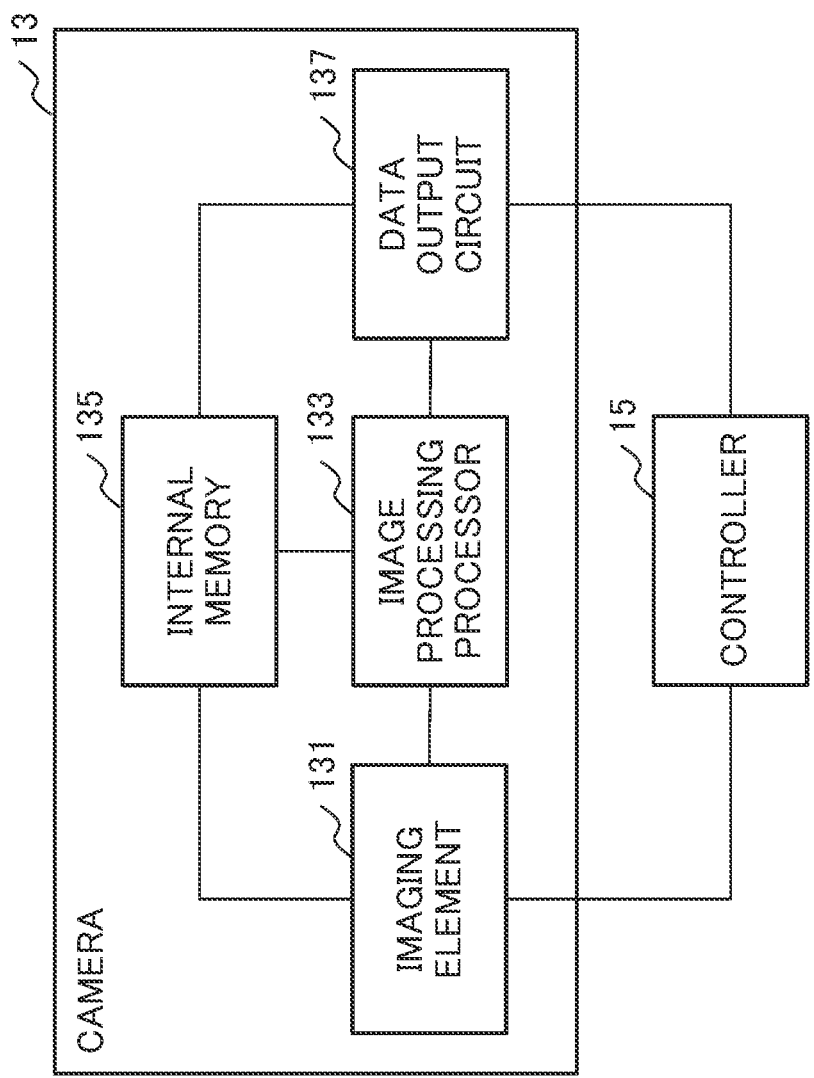
FIG. 10 is a conceptual diagram illustrating an example of a configuration of a camera included in the detection device included in the display system according to the first example embodiment of the present invention.

FIG. 10 is a block diagram illustrating an example of a configuration of the camera 13. The camera 13 includes an imaging element 131, an image processing processor 133, an internal memory 135, and a data output circuit 137. For example, the camera 13 has an imaging function of a general digital camera capable of detecting light having a wavelength in a visible region. In a case where the tag 100 emits light of a wavelength other than the visible region, the camera 13 is configured to be able to detect the light emission of the tag 100. For example, in a case where the tag 100 emits light having a wavelength in the near-infrared region, the camera 13 may be configured by an infrared camera capable of detecting light having a wavelength in the near-infrared region.

The imaging element 131 is an element for capturing an image of an imaging region and acquiring image data of the imaging region. The imaging element 131 is achieved by a photoelectric conversion element including a semiconductor integrated circuit. The imaging element 131 can be achieved by, for example, a solid-state imaging element such as a charge-coupled device (CCD) or a complementary metaloxide-semiconductor (CMOS). In general, the imaging element 131 is achieved by an element that images light having a wavelength in a visible region, but may be achieved by an element that can image and detect electromagnetic waves such as infrared rays, ultraviolet rays, X-rays, gamma rays, radio waves, and microwaves.

The image processing processor 133 is an integrated circuit that generates image data obtained by applying image processing such as dark current correction, interpolation calculation, color space conversion, gamma correction, aberration correction, noise reduction, and image compression to the imaging data captured by the imaging element 131. For example, the image processing processor 133 is configured to increase the contrast with respect to the light emission of the light emitting element 107 or find weak light by performing processing of obtaining a difference with respect to the image data obtained by performing high-speed imaging. Since the light emission of the light emitting element 107 is very weak, the image processing processor 133 performs image processing on the image data, thereby making it easy to detect the light emission of the light emitting element 107.

The internal memory 135 is a storage element that temporarily holds image information that cannot be processed when the image processing processor 133 performs image processing, or processed image information. The image information captured by the imaging element 131 may be temporarily stored in the internal memory 135. It is sufficient that the internal memory 135 is configured by a general memory.

The data output circuit 137 outputs the image data processed by the image processing processor 133 to the controller 15.

The configuration of the camera 13 has been described above. The configuration of FIG. 10 is an example, and the configuration of the camera 13 is not limited to the original form.

[Controller]

Figure 11:
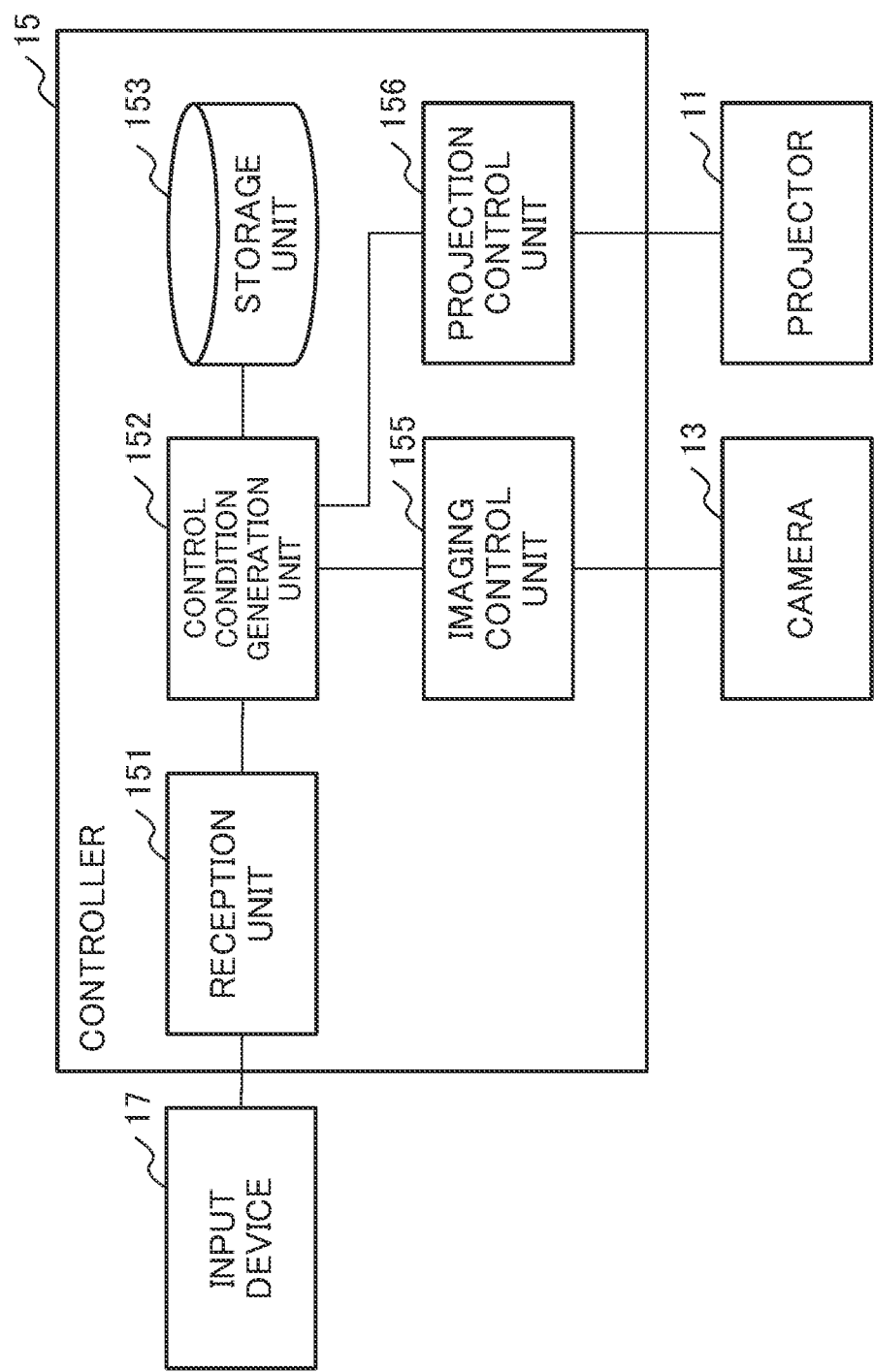
FIG. 11 is a conceptual diagram illustrating an example of a configuration of a controller included in the detection device included in the display system according to the first example embodiment of the present invention.

FIG. 11 is a block diagram illustrating a configuration of the controller 15. As illustrated in FIG. 11, the controller 15 includes a reception unit 151, a control condition generation unit 152, a storage unit 153, an imaging control unit 155, and a projection control unit 156. The reception unit 151 is connected to the input device 17. The imaging control unit 155 is connected to the camera 13. The projection control unit 156 is connected to the projector 11.

The reception unit 151 is connected to the input device 17 and the control condition generation unit 152. The reception unit 151 receives identification information on a stored article to be picked and identification information on a stored article to be stored from the input device 17. The reception unit 151 outputs the received identification information to the control condition generation unit 152.

The control condition generation unit 152 is connected to the reception unit 151, the storage unit 153, the imaging control unit 155, and the projection control unit 156. The control condition generation unit 152 generates a projection condition for projecting a desired image from the projector 11 on an appropriate position at an appropriate timing. The projection condition includes a modulation element control condition for displaying a pattern relevant to a desired image on the display surface of the spatial light modulator 115 and a light source control condition for projecting projection light at an appropriate timing. The control condition generation unit 152 outputs a projection condition including the modulation element control condition and the light source control condition to the projection control unit 156.

The control condition generation unit 152 acquires the identification information from the reception unit 151. When acquiring the identification information, the control condition generation unit 152 outputs an imaging instruction signal for causing the camera 13 to perform imaging at a predetermined timing to the imaging control unit 155. The control condition generation unit 152 may generate an imaging instruction signal for causing the camera 13 to perform imaging at regular time intervals, or may generate an imaging instruction signal for causing the camera 13 to perform imaging in a sequence that is not at regular time intervals. The control condition generation unit 152 outputs an imaging stop signal to the imaging control unit 155 when stopping imaging by the camera 13. The timing at which the control condition generation unit 152 outputs the imaging stop signal can be arbitrarily set, such as a time point when the tag 100 having the identification code relevant to the identification information is detected or a time point when a predetermined time has elapsed.

When receiving the identification information, the control condition generation unit 152 generates the projection condition of the scanning light relevant to the identification information. The control condition generation unit 152 acquires a pattern for displaying the scanning light on the projection surface from the storage unit 153. The control condition generation unit 152 generates a timing at which a pattern for displaying the scanning light on the projection surface is displayed on the display surface of the spatial light modulator 115 in order to project the pulsed light that can be converted into the identification information at a predetermined interval. The timing at which the control condition generation unit 152 generates the projection condition of the scanning light may be the time point at which the identification information is acquired from the reception unit 151, or may be the time point after the image data captured by the camera 13 is acquired.

The control condition generation unit 152 acquires image data captured by the camera 13 according to the imaging instruction signal from the imaging control unit 155. The control condition generation unit 152 extracts the feature of the tag 100 from the acquired image data and specifies the position of the tag 100. The control condition generation unit 152 generates a control condition for projecting the scanning light on the position of the tag 100 at the specified position of the tag 100. When the plurality of tags 100 are extracted, the control condition generation unit 152 generates a control condition for sequentially projecting the scanning light on the tags 100. The control condition generation unit 152 outputs the generated control condition to the projection control unit 156.

Figure 12:
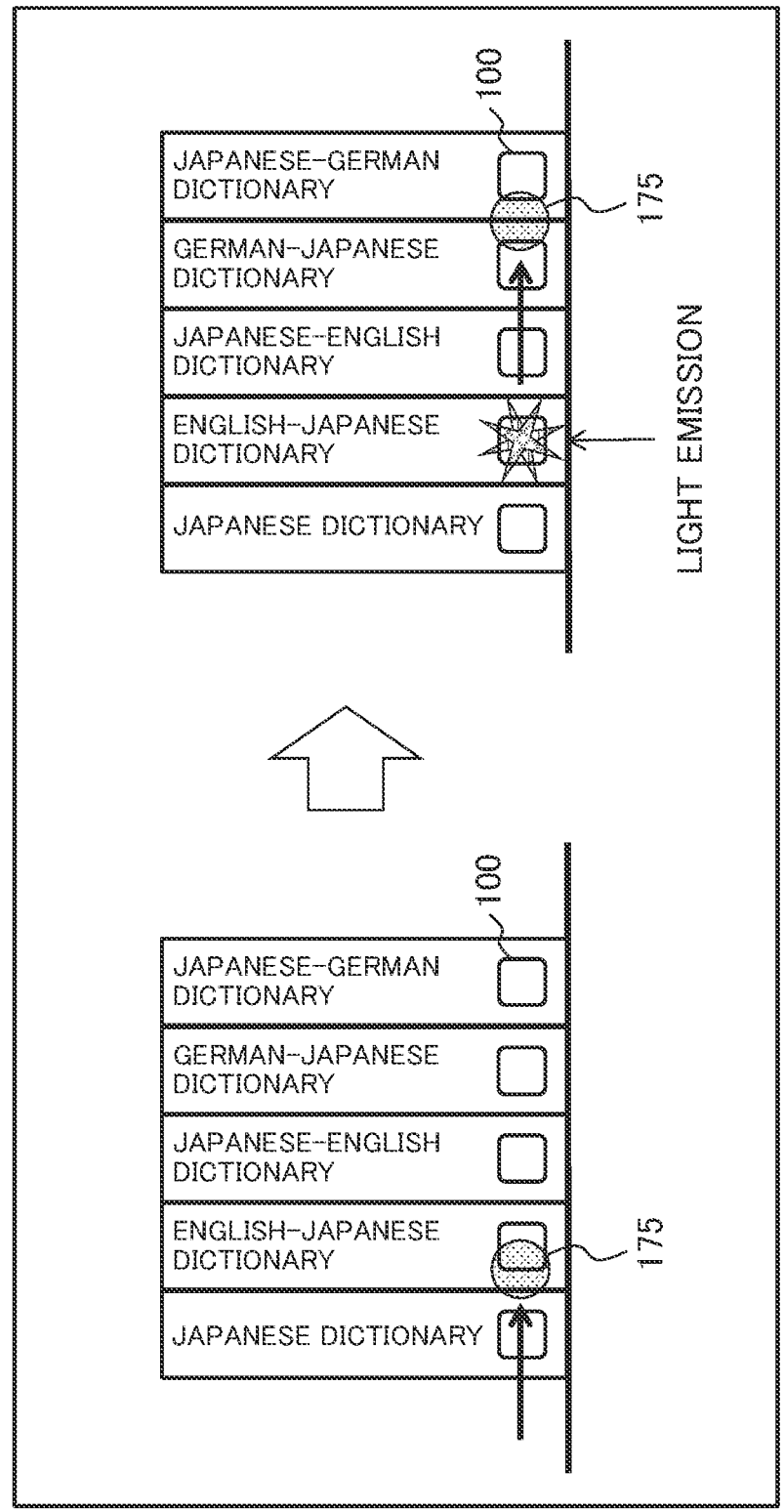
FIG. 12 is a conceptual diagram for explaining an example of a scanning method by the display system according to the first example embodiment of the present invention.
Figure 13:
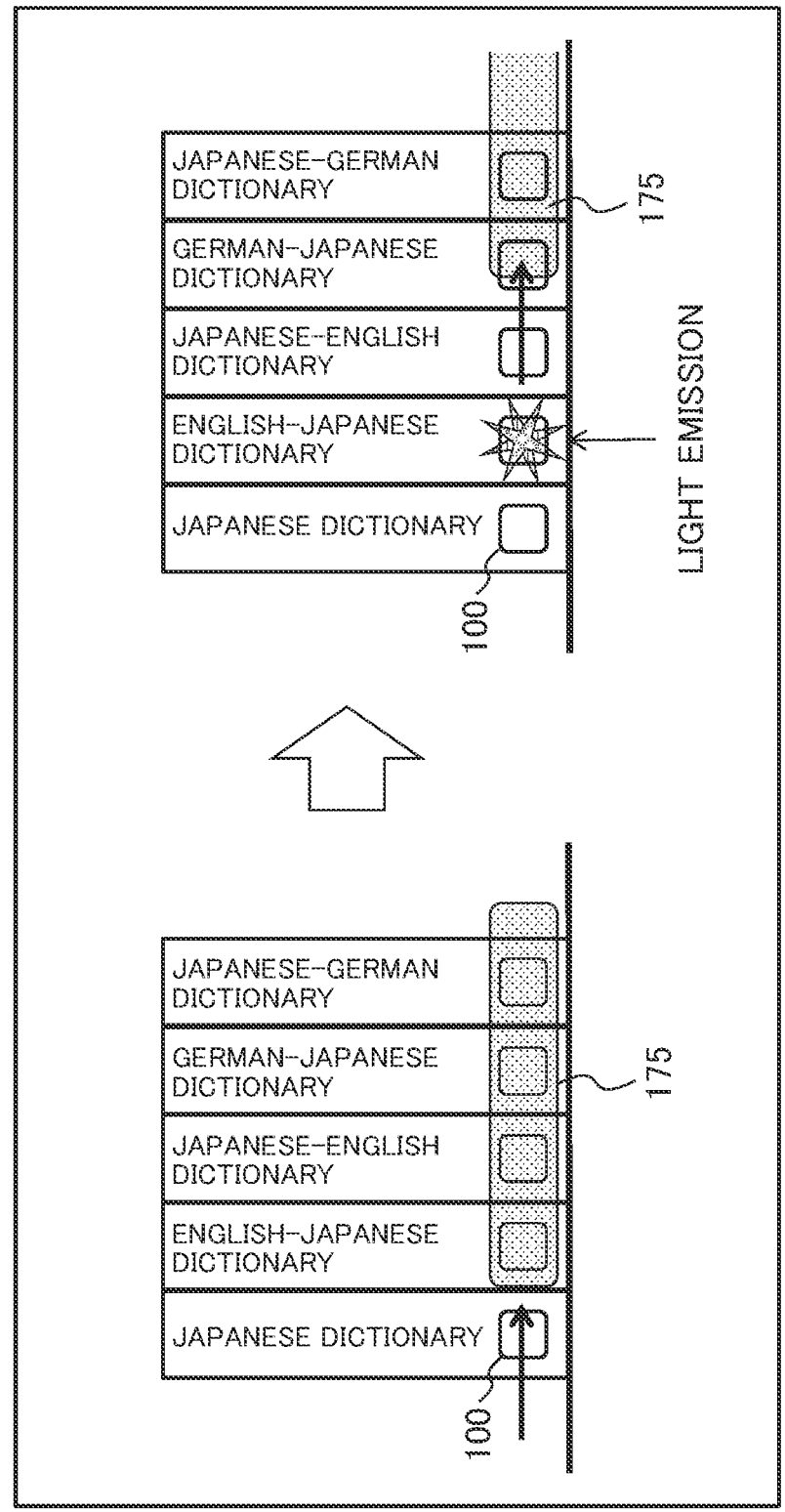
FIG. 13 is a conceptual diagram for explaining another example of the scanning method by the display system according to the first example embodiment of the present invention.

FIG. 12 illustrates an example in which a plurality of tags 100 are individually scanned with circular scanning light 175. FIG. 13 illustrates an example in which the plurality of tags 100 are scanned together with the scanning light 175 having an elongated shape. In the examples of FIGS. 12 and 13, a state in which the tag 100 relevant to the identification signal included in the scanning light 175 among the tags 100 on which the scanning light 175 is projected emits light is illustrated.

During the period in which the scanning light is projected from the projector 11, the control condition generation unit 152 continues to acquire the image data on which the scanning light is projected. The control condition generation unit 152 continues to acquire image data captured at the imaging interval at which the light emission of the tag 100 can be detected during the period in which the scanning light is projected. For example, the imaging interval by the camera 13 may be set to a time interval shorter than the light emission time of the tag 100.

When detecting the light emission of the tag 100 from the image data, the control condition generation unit 152 acquires a pattern relevant to the marking light to be displayed at the position including the tag 100 from the storage unit 153, and displays the acquired pattern on the display surface of the spatial light modulator 115. The position where the marking light is displayed is not particularly limited as long as the position of the stored article to which the tag 100 whose light emission has been detected is attached can be recognized. For example, when the tag 100 attached to the stored article to be picked up emits light, the marking light may be displayed on the stored article to which the tag 100 is attached. For example, when the storage place of the stored article to be stored is indicated by light emission of the tag 100, it is sufficient that the marking light is displayed in a range including the storage place.

Figure 14:
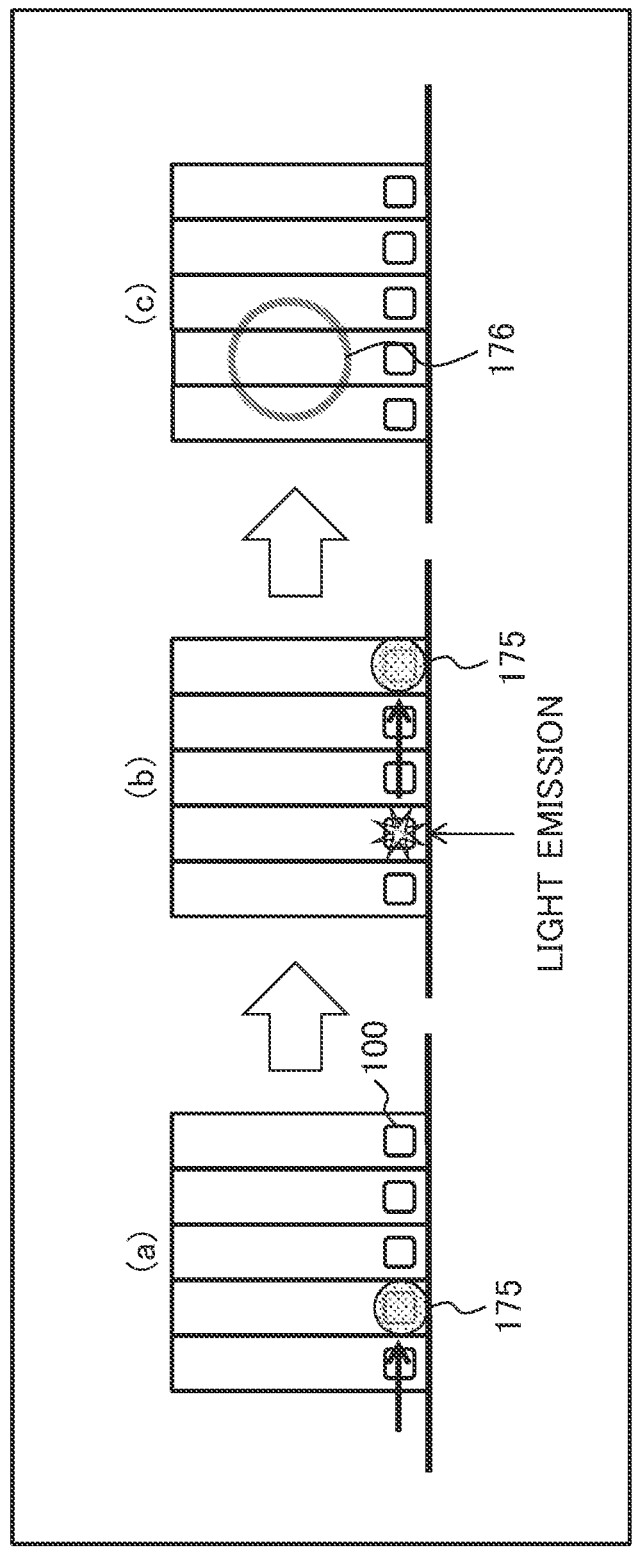
FIG. 14 is a conceptual diagram for explaining an example of projection of scanning light and marking light by the display system according to the first example embodiment of the present invention.

FIG. 14 is an example in which the marking light is displayed on the stored article to be selected (also referred to as a selection article). (a) of FIG. 14 is a state in which the scanning light 175 is projected onto the tag 100 relevant to the identification signal. (b) of FIG. 14 is a state in which the tag 100 relevant to the identification signal emits light. (c) of FIG. 14 is a state in which marking light 176 is displayed on the stored article to be selected to which light emitting tag 100 is attached.

Figure 15:
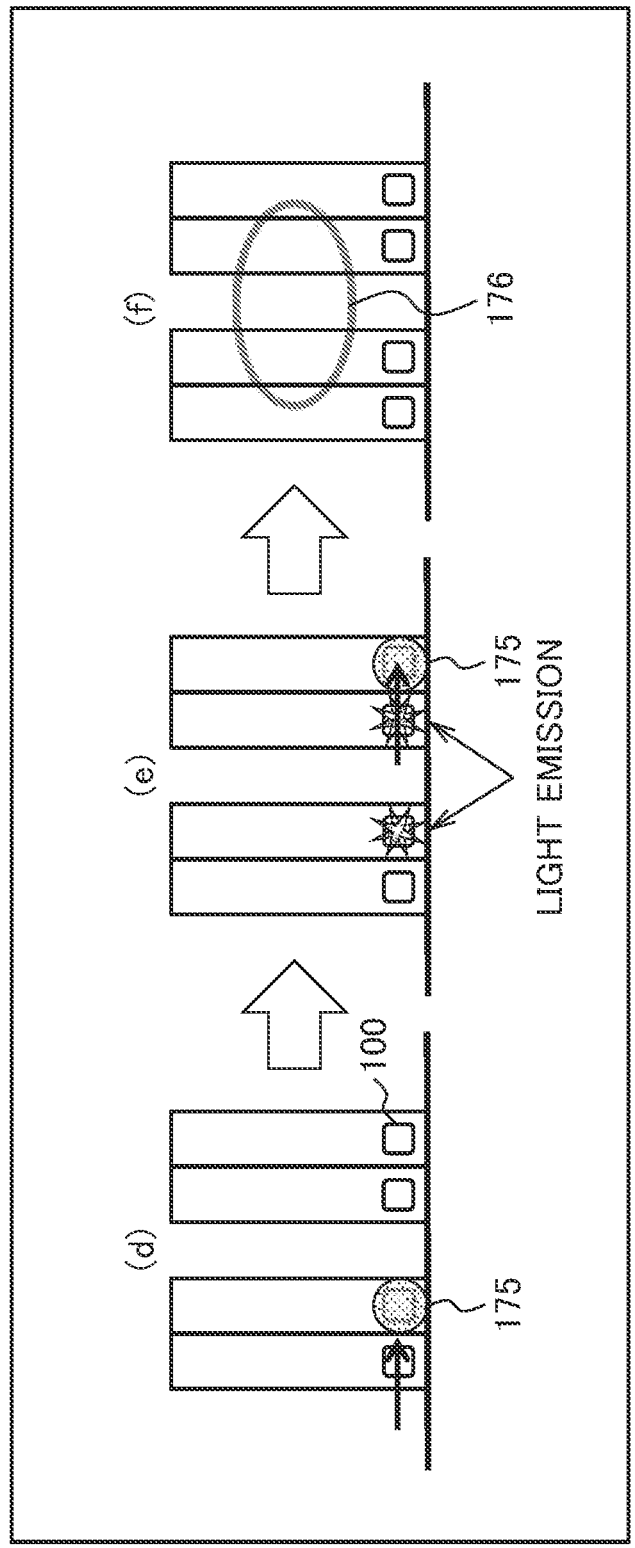
FIG. 15 is a conceptual diagram for explaining another example of projection of scanning light and marking light by the display system according to the first example embodiment of the present invention.

FIG. 15 is an example in which the marking light is displayed in a range including the storage place of the storage article. (a) of FIG. 15 is a state in which the scanning light 175 is projected onto the tag 100 adjacent to the storage place of the storage article. (b) of FIG. 15 is a state in which tag 100 attached to a stored article at a position adjacent to a storage place of the storage article emits light. (c) of FIG. 15 is a state in which the marking light 176 is displayed in a range including the storage place of the storage article. For example, when a book stored in a library is assumed as a stored article, a configuration may be such that the storage place of the storage article is detected by using the classification number of the book as an identification signal.

The storage unit 153 stores patterns relevant to the scanning light and the marking light. For example, when the scanning light is projected on each tag 100, it is sufficient that a pattern relevant to the scanning light matching the shape and size of the tag 100 is stored in the storage unit 153. For example, in the case of projecting the scanning light in the range including the plurality of tags 100, it is sufficient that a pattern relevant to the scanning light having a shape or size including the plurality of tags 100 is stored in the storage unit 153.

The projection control unit 156 acquires a projection condition including a modulation element control condition and a light source control condition from the control condition generation unit 152. The projection control unit 156 controls a drive voltage and ON/OFF of the electric power supply of the light source 112 on the basis of a light source control condition included in the projection condition. The projection control unit 156 displays a pattern relevant to the image displayed on the projection surface on the display surface of the spatial light modulator 115 on the basis of the modulation element control condition included in the projection condition.

The imaging control unit 155 acquires the imaging instruction signal from the control condition generation unit 152. The imaging control unit 155 causes the camera 13 to image the imaging region according to the imaging instruction signal. The imaging control unit 155 acquires image data obtained by imaging according to the imaging instruction signal from the camera 13. The imaging control unit 155 outputs the acquired image data to the control condition generation unit 152. The imaging control unit 155 acquires the imaging stop signal from the control condition generation unit 152. The imaging control unit 155 stops the camera 13 according to the imaging stop signal.

The details of the configuration of the controller 15 have been described above. The configuration of FIG. 11 is an example, and the configuration of the controller 15 is not limited to the original form.

Here, timings of light projection by the projector 11 and imaging by the camera 13 of the detection device 10 and timings of the start of the tag controller 105 of the tag 100 and light emission of the light emitting element 107 will be described with reference to the drawings.

Figure 16:
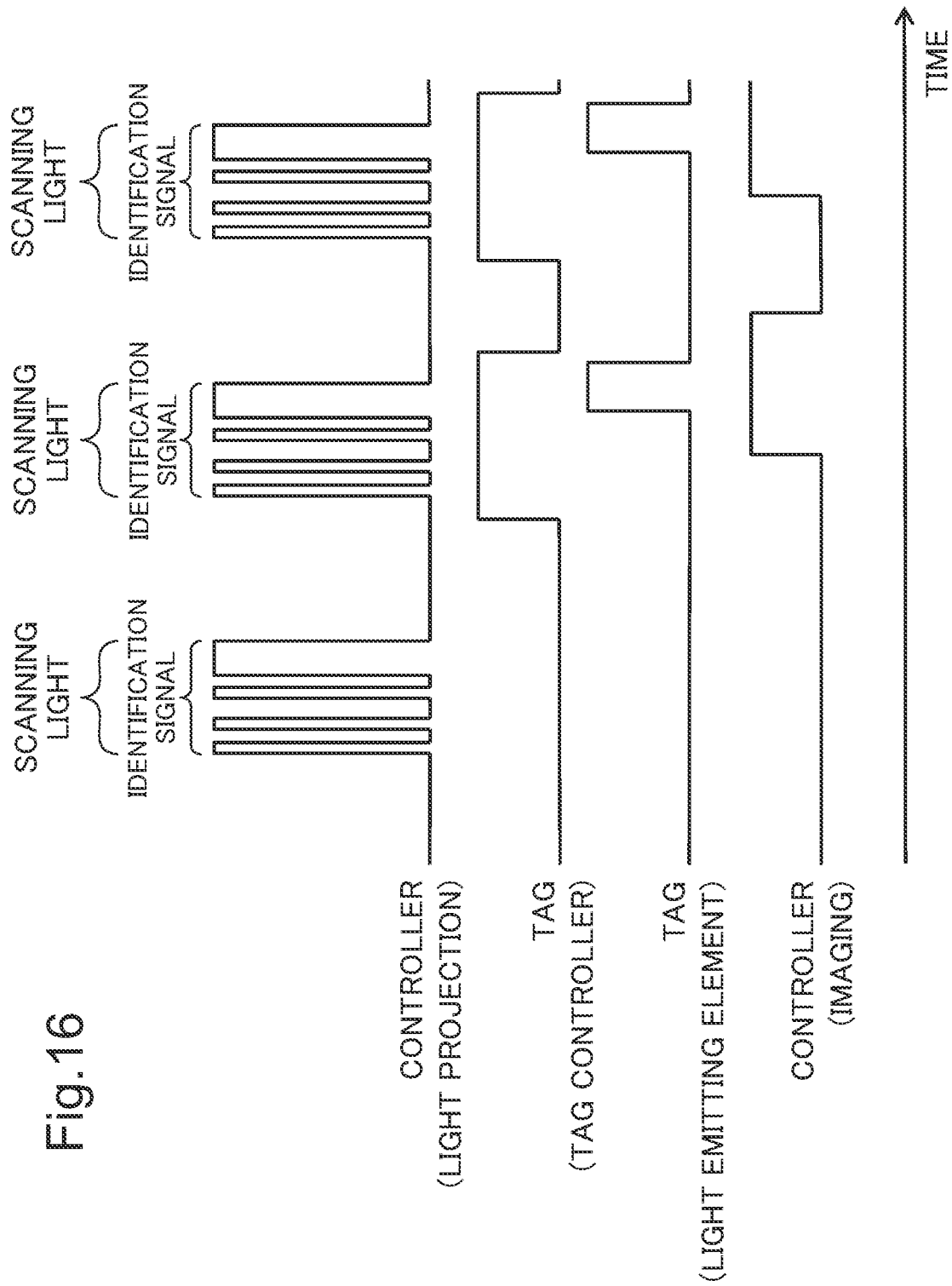
FIG. 16 is a timing chart for explaining an example of operation timing of the display system of the first example embodiment of the present invention.

FIG. 16 is a timing chart for explaining an example of operation timings of the detection device 10 and the tag 100. FIG. 16 illustrates an example in which scanning light including an identification signal is continuously and intermittently projected.

First, the detection device 10 continuously and intermittently projects scanning light including an identification signal generated on the basis of the identification information from the projector 11.

When receiving the scanning light, the light detection element 101 of the tag 100 converts the received scanning light into electricity and stores the electricity in the power storage element 103. Although FIG. 16 illustrates that the tag controller 105 is started by scanning light for one pulse, the tag controller 105 may be started by scanning light for several pulses.

When sufficient electric power is accumulated in the power storage element 103, the tag controller 105 is started. When started, the tag controller 105 verifies whether the identification signal included in the received scanning light is relevant to its own identification code. When the identification signal included in the received scanning light is relevant to its own identification code, the tag controller 105 supplies electric power to the light emitting element 107 to cause the light emitting element 107 to emit light. On the other hand, when the identification signal included in the received scanning light is not relevant to its own identification code, the tag controller 105 does not supply electric power to the light emitting element 107.

When projecting the scanning light, the detection device 10 causes the camera 13 to image the imaging range at least during a period in which the light emitting element 107 of the tag 100 emits light. When the light emission period of the light emitting element 107 can be estimated on the basis of the position of the tag 100, it is sufficient that the camera 13 is caused to perform imaging only during the period.

Figure 17:
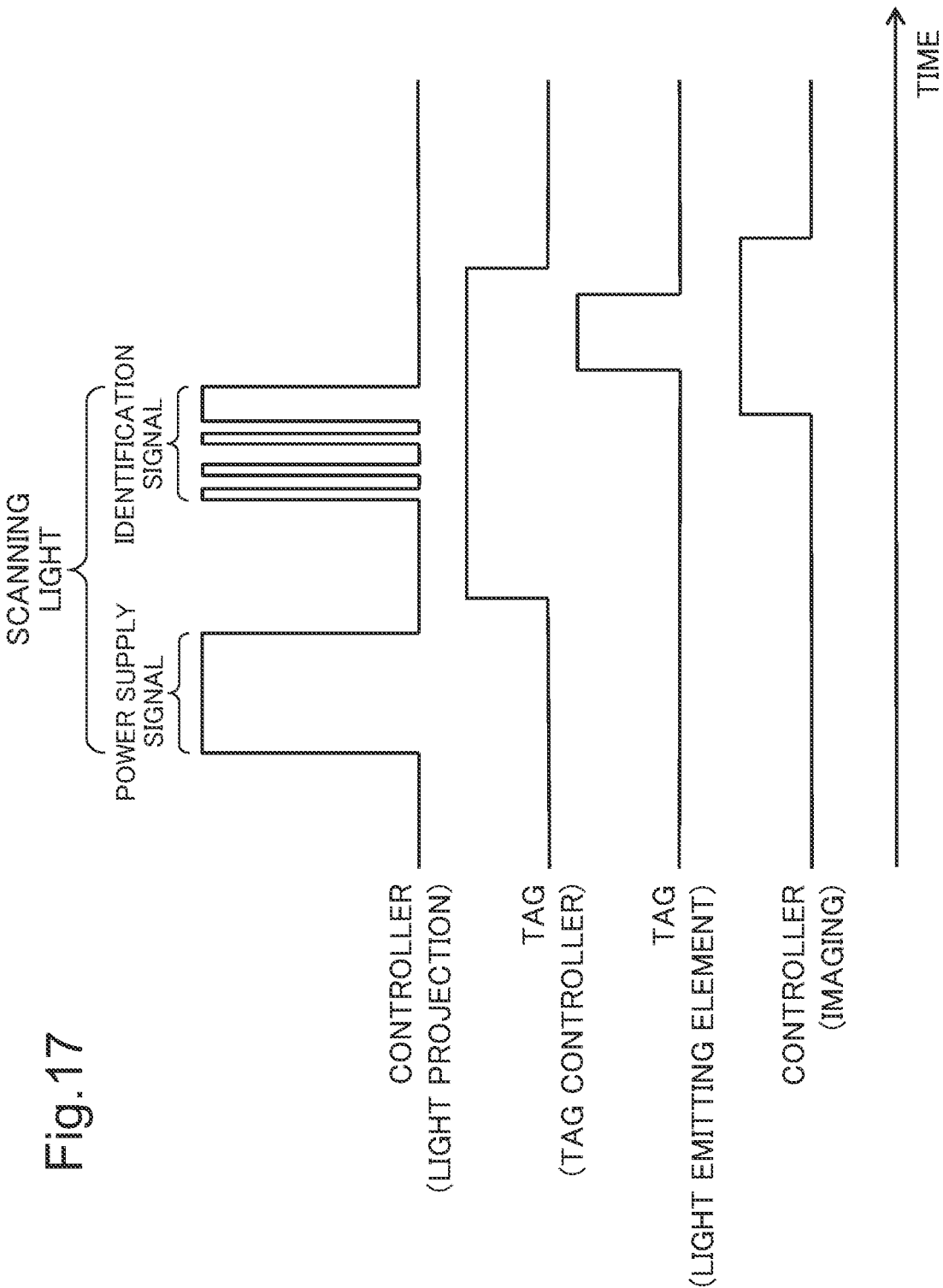
FIG. 17 is a timing chart for explaining another example of the operation timing of the display system of the first example embodiment of the present invention.

FIG. 17 is a timing chart for explaining another example of operation timings of the detection device 10 and the tag 100. In the example of FIG. 17, the detection device 10 projects a power supply signal for supplying electric power to the tag controller 105 and the light emitting element 107 of the tag 100 prior to the identification signal. Although only one pair of the power supply signal and the identification signal is illustrated in FIG. 17, the detection device 10 continuously and intermittently projects the pair of the power supply signal and the identification signal as in the example of FIG. 16.

First, the detection device 10 projects scanning light including a power supply signal for supplying electric power to the tag controller 105 and the light emitting element 107 of the tag 100 and an identification signal generated on the basis of the identification information. The power supply signal is projected prior to the identification signal to supply electric power to the tag 100.

When receiving the power supply signal, the light detection element 101 of the tag 100 converts the received power supply signal into electricity and stores the electricity in the power storage element 103. When sufficient electric power is accumulated in the power storage element 103, the tag controller 105 is started. When started, the tag controller 105 verifies whether the identification signal included in the received scanning light is relevant to its own identification code. When the identification signal included in the received scanning light is relevant to its own identification code, the tag controller 105 supplies electric power to the light emitting element 107 to cause the light emitting element 107 to emit light. On the other hand, when the identification signal included in the received scanning light is not relevant to its own identification code, the tag controller 105 does not supply electric power to the light emitting element 107.

When projecting the scanning light, the detection device 10 images the imaging range at least during a period in which the light emitting element 107 of the tag 100 emits light. When the light emission period of the light emitting element 107 can be estimated on the basis of the position of the tag 100, it is sufficient that the imaging is performed only during the period.

The timing of light projection and imaging by the detection device 10 and the timing of start of the tag controller 105 of the tag 100 and light emission of the light emitting element 107 have been described above. The timings illustrated in FIGS. 16 and 17 are merely examples, and the timings of the operations of the detection device 10 and the tag 100 of the present example embodiment are not limited as they are.

[Control Condition Generation Unit]

Figure 18:
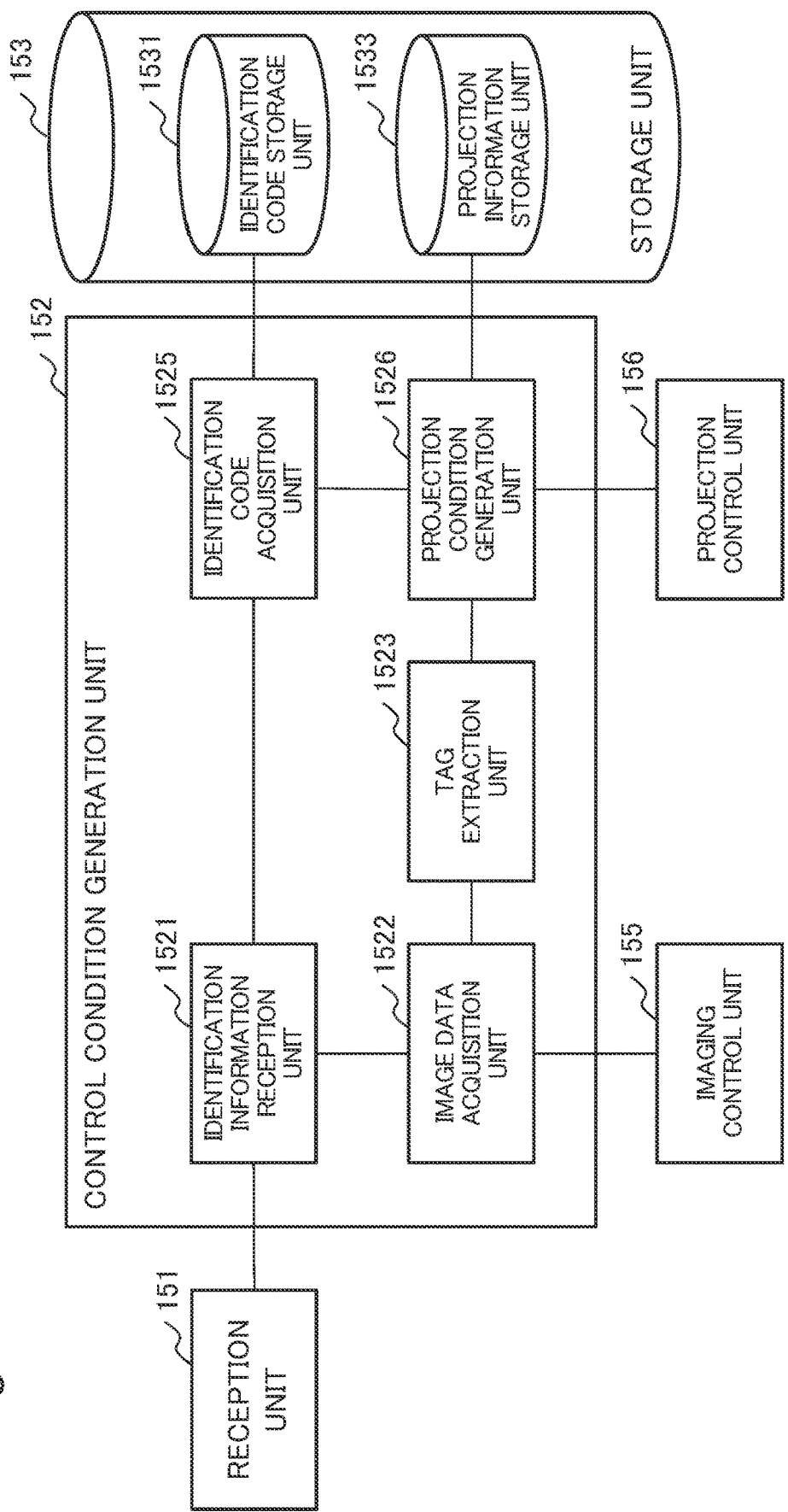
FIG. 18 is a conceptual diagram illustrating an example of a configuration of a control condition generation unit included in the controller included in the detection device included in the display system of the first example embodiment of the present invention.

Next, detailed configurations of the control condition generation unit 152 and the storage unit 153 will be described with reference to the drawings. FIG. 18 is a block diagram for explaining a detailed configuration of the control condition generation unit 152 and the storage unit 153. As illustrated in FIG. 18, the control condition generation unit 152 includes an identification information reception unit 1521, an image data acquisition unit 1522, a tag extraction unit 1523, an identification code acquisition unit 1525, and a projection condition generation unit 1526. The storage unit 153 includes an identification code storage unit 1531 and a projection information storage unit 1533.

The identification information reception unit 1521 is connected to the reception unit 151, the image data acquisition unit 1522, and the identification code acquisition unit 1525. The identification information reception unit 1521 acquires the identification information from reception unit 151. The identification information reception unit 1521 outputs the acquired identification information to the image data acquisition unit 1522. The identification information reception unit 1521 outputs the acquired identification information to identification code acquisition unit 1525.

The image data acquisition unit 1522 is connected to the identification information reception unit 1521, the tag extraction unit 1523, and the imaging control unit 155. The image data acquisition unit 1522 acquires the identification information from the identification information reception unit 1521. When acquiring the identification information, the identification information reception unit 1521 generates an imaging instruction signal instructing imaging by the camera 13. The image data acquisition unit 1522 outputs the generated imaging instruction signal to the image data acquisition unit 1522. The image data acquisition unit 1522 acquires image data obtained by imaging according to the imaging instruction signal from the imaging control unit 155. The image data acquisition unit 1522 outputs the acquired image data to the tag extraction unit 1523.

The image data acquisition unit 1522 generates an imaging stop signal for stopping imaging by the camera 13. The image data acquisition unit 1522 outputs the generated imaging stop signal to the image data acquisition unit 1522. The timing at which the image data acquisition unit 1522 generates the imaging stop signal may be set to a predetermined timing, or may be set according to the detection of the tag 100.

The tag extraction unit 1523 is connected to the image data acquisition unit 1522 and the projection condition generation unit 1526. The tag extraction unit 1523 acquires image data from the image data acquisition unit 1522.

When the image data for extracting the tag 100 is acquired, the tag extraction unit 1523 extracts the feature of the tag 100 from the image data and specifies the position of the tag 100. When the features of the tag 100 are extracted at a plurality of portions from the image data, the tag extraction unit 1523 specifies the positions of all the tags 100 included in the image data. The tag extraction unit 1523 outputs the specified position of the tag 100 to the projection condition generation unit 1526.

When the image data including the portion where the scanning light is projected is acquired, the tag extraction unit 1523 detects light emission of the tag 100 from the image data and specifies the position of the light emission. When light emission of the tag 100 is detected at a plurality of points in the image data, the tag extraction unit 1523 specifies all light emission positions included in the image data. The tag extraction unit 1523 outputs the specified light emission position to the projection condition generation unit 1526.

The identification code acquisition unit 1525 is connected to the identification information reception unit 1521, the projection condition generation unit 1526, and the identification code storage unit 1531 of the storage unit 153. The identification code acquisition unit 1525 acquires the identification information from the identification information reception unit 1521. The identification code acquisition unit 1525 acquires the identification code relevant to the acquired identification information from the identification code storage unit 1531. The identification code acquisition unit 1525 outputs the acquired identification code to the projection condition generation unit 1526.

The projection condition generation unit 1526 is connected to the tag extraction unit 1523, the identification code acquisition unit 1525, the projection information storage unit 1533 of the storage unit, and the projection control unit 156.

When extracting the tag 100, the projection condition generation unit 1526 acquires the position of the tag 100 from the tag extraction unit 1523. The projection condition generation unit 1526 acquires a pattern for projecting the scanning light from the projection information storage unit 1533. The projection condition generation unit 1526 generates a projection condition for projecting the acquired pattern onto the position of the tag 100. When scanning the plurality of tags 100 with the scanning light, the projection condition generation unit 1526 generates projection condition for projecting the scanning light to all the tags 100.

When detecting the light emission of the tag 100, the projection condition generation unit 1526 acquires the light emission position of the tag 100 from the tag extraction unit 1523. The projection condition generation unit 1526 acquires a pattern for displaying the marking light related to the identification information from the projection information storage unit 1533. The projection condition generation unit 1526 generates a projection condition for projecting a pattern on a position of a stored article to which the tag 100 is attached or on a position near a stored article to be stored. When the marking light is displayed at the light emission positions of the plurality of tags 100, the projection condition generation unit 1526 generates a projection condition for displaying the marking light on the light emission positions of all the tags 100.

The details of the configuration of the control condition generation unit 152 have been described above. The configuration of FIG. 18 is an example, and the configuration of the control condition generation unit 152 is not limited to the original form.

(Operation)

Next, an example of an operation of the display system of the present example embodiment will be described with reference to the drawings. Operations of the tag 100, the controller 15, the projector 11, and the camera 13 will be described below in order.

[Tag]

Figure 19:
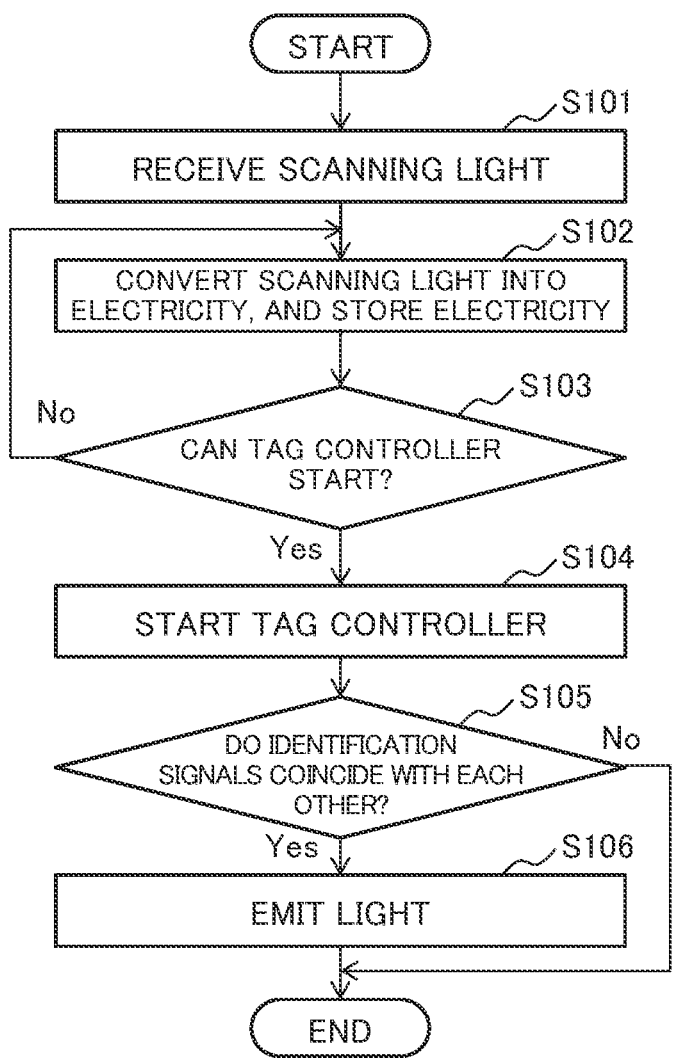
FIG. 19 is a flowchart for explaining an example of operation of a tag included in the display system of the first example embodiment of the present invention.

FIG. 19 is a flowchart for explaining an example of the operation of the tag 100. In the description along the flowchart of FIG. 19, the tag 100 will be described as main operation.

In FIG. 19, first, the light detection element 101 of the tag 100 receives scanning light (step S101).

Next, the light detection element 101 of the tag 100 converts the scanning light into electricity, and stores the converted electricity in the power storage element 103 (step S102).

When electric power that can start the tag controller 105 is stored in the power storage element 103 (Yes in step S103), the tag controller 105 is started (step S104). On the other hand, when the electric power that can start the tag controller 105 is not stored in the power storage element 103 (No in step S103), the process returns to step S102.

When the tag controller 105 is started (step S104), the tag controller 105 compares the identification signal included in the scanning light with its own identification code (step S105).

When the identification signal included in the scanning light matches its own identification code (Yes in step S105), the tag controller 105 causes the light emitting element 107 to emit light (step S106). On the other hand, when the identification signal included in the scanning light does not match its own identification code (No in step S105), the tag controller 105 does not cause the light emitting element 107 to emit light.

An example of the operation of the tag 100 has been described above. The processing along the flowchart of FIG. 19 is an example, and the operation of the tag 100 of the present example embodiment is not limited to the procedure as it is.

[Controller]

Figure 20:
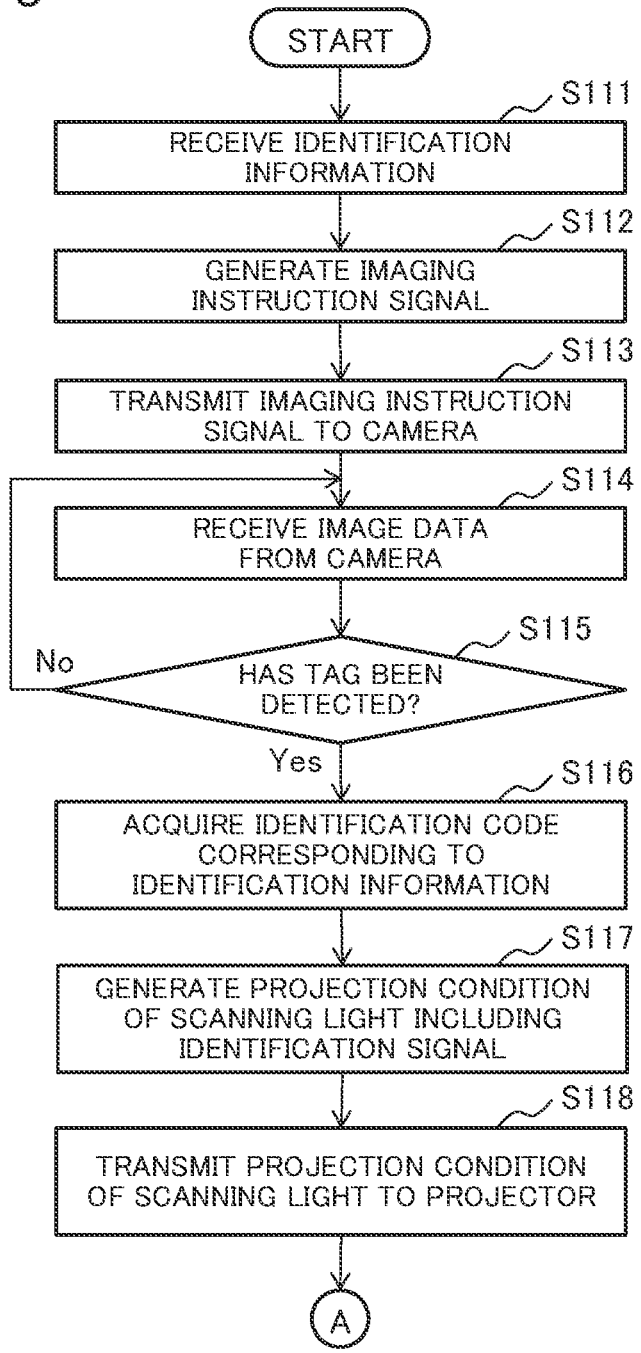
FIG. 20 is a flowchart for explaining an example of the operation of the controller included in the detection device included in the display system of the first example embodiment of the present invention.
Figure 21:
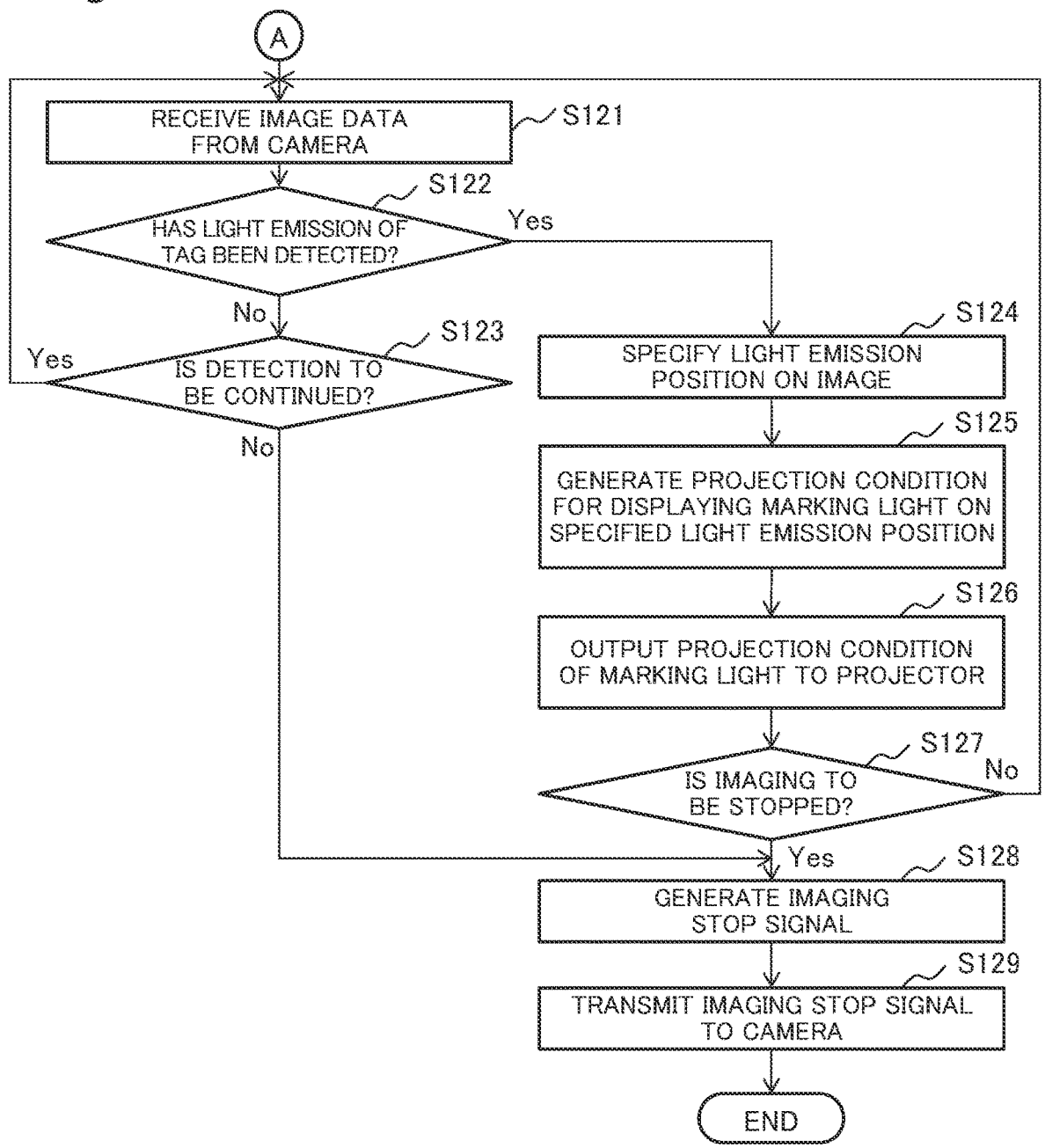
FIG. 21 is a flowchart for explaining an example of the operation of the controller included in the detection device included in the display system of the first example embodiment of the present invention.

FIGS. 20 and 21 are flowcharts for explaining the operation of the controller 15. In the description along FIGS. 20 and 21, the components of the controller 15 illustrated in FIG. 11 will be described as the main operation components.

In FIG. 20, first, the reception unit 151 receives the identification information on the selection article and the storage article from the input device 17 (step S111).

Next, the control condition generation unit 152 generates an imaging instruction signal that instructs imaging by the camera 13 (step S112).

Next, the imaging control unit 155 transmits the imaging instruction signal generated by the control condition generation unit 152 to the camera 13 (step S113).

Next, the imaging control unit 155 receives image data obtained by imaging according to the imaging instruction signal from the camera 13 (step S114).

Here, when detecting the tag from the received image data (Yes in step S115), the control condition generation unit 152 acquires a pattern for displaying the scanning light from the storage unit 153 (step S116). On the other hand, when no tag is detected from the received image data (No in step S115), the process returns to step S114.

When the pattern for displaying the scanning light is acquired from the storage unit 153 (step S116), the control condition generation unit 152 generates the projection condition for projecting the scanning light (step S117).

Next, the control condition generation unit 152 transmits the projection condition of the scanning light to the projector 11 (step S118). After step S118, the process proceeds to A of FIG. 21.

In FIG. 21, first, the imaging control unit 155 receives image data captured after the scanning light is projected from the camera 13 (step S121).

Here, the control condition generation unit 152 verifies whether the light emission of the tag 100 is included in the image data captured after the scanning light is projected (step S122). For example, the control condition generation unit 152 verifies whether light emission of the tag 100 is included in the image data at a preset timing.

When the light emission of the tag 100 is not detected in the image data captured after the scanning light is projected (No in step S122) and the detection is to be continued (Yes in step S123), the process returns to step S121. When the light emission of the tag 100 is not detected in the image data captured after the scanning light is projected (No in step S122) and the detection is not to be continued (No in step S123), the process proceeds to step S128.

On the other hand, when the light emission of the tag 100 is detected in the image data captured after the scanning light is projected (Yes in step S122), the control condition generation unit 152 specifies the light emission position in the image data (step S124).

When the light emission position in the image data is specified (step S124), the control condition generation unit 152 generates a projection condition for displaying the marking light on the specified light emission position (step S125).

The projection control unit 156 outputs the projection condition generated by the control condition generation unit 152 to the projector 11 (step S126).

Here, when the imaging by the camera 13 is stopped (Yes in step S127), the control condition generation unit 152 generates an imaging stop signal for stopping the imaging by the camera 13 (step S128). On the other hand, when the imaging by the camera 13 is to be continued (No in step S127), the process returns to step S121.

Then, the imaging control unit 155 transmits the imaging stop signal generated by the control condition generation unit 152 to the camera 13 (step S129).

An example of the operation of the controller 15 has been described above. The processing along the flowcharts of FIGS. 20 and 21 is an example, and the operation of the controller 15 of the present example embodiment is not limited to the procedure as it is.

[Projector]

Figure 22:
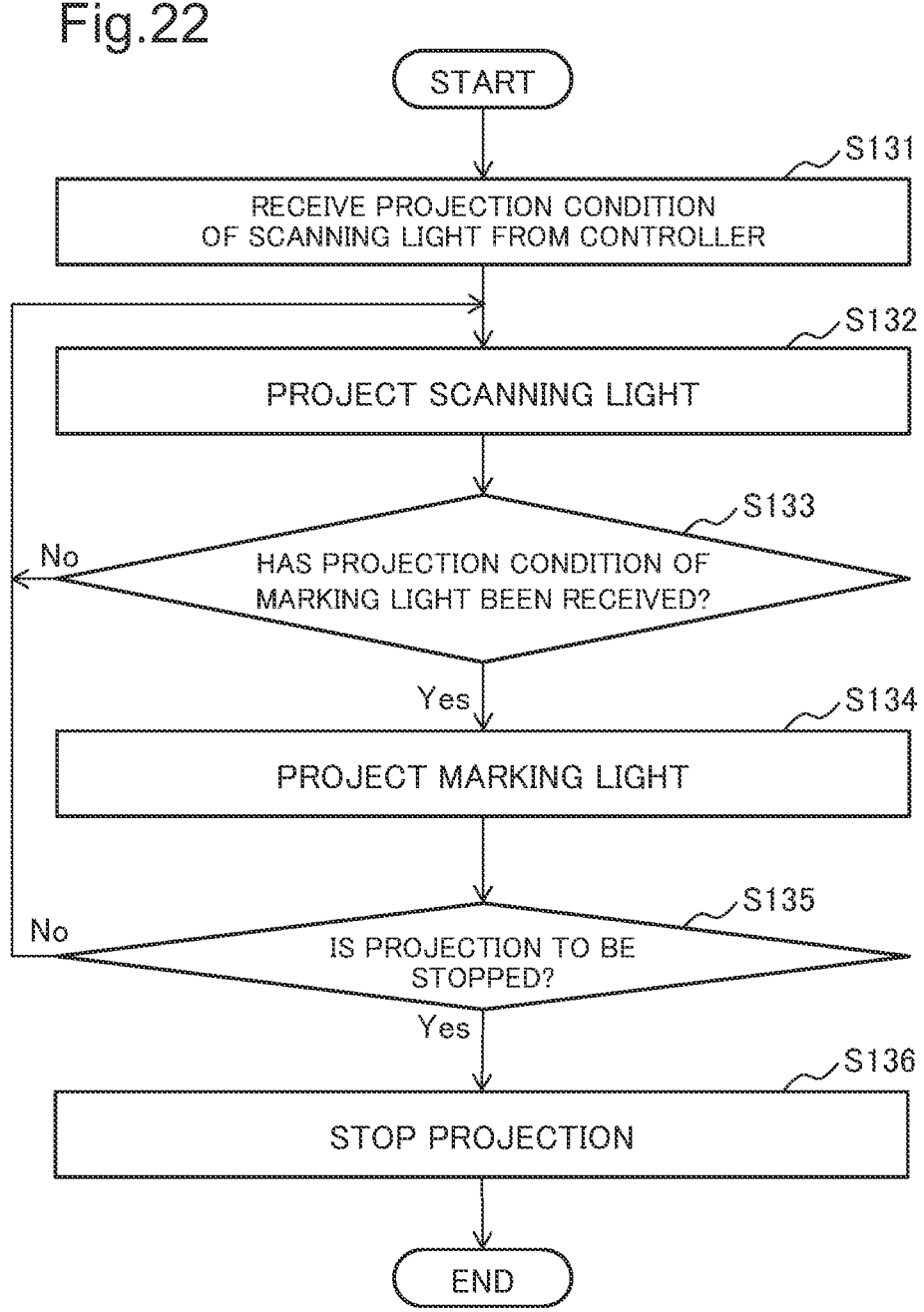
FIG. 22 is a flowchart for explaining an example of the operation of the projector included in the detection device included in the display system of the first example embodiment of the present invention.

FIG. 22 is a flowchart for explaining the operation of the projector 11. In the description along the flowchart of FIG. 22, the projector 11 will be described as main operation.

In FIG. 22, first, the projector 11 receives a projection condition of the scanning light from the controller 15 (step S131).

Next, the projector 11 projects scanning light on the basis of the received projection condition (step S132).

When receiving the projection condition of the marking light (Yes in step S133), the projector 11 projects the marking light on the basis of the received projection condition (step S134). On the other hand, when the projection condition of the marking light has not been received (No in step S133), the process returns to step S132. After the projection of the marking light, the scanning light may be continuously projected.

After projecting the marking light on the basis of the received projection condition (step S134), the projector 11 stops the projection according to the situation (step S135).

When the projection of the marking light is to be stopped (Yes in step S135), the projector 11 stops the projection of the marking light (step S136). For example, the projector 11 stops the projection when a predetermined time elapses after the marking light is projected or when an instruction to stop the projection is received from the controller 15. On the other hand, when the projection of the marking light is not stopped (No in step S135), the process returns to step S132.

An example of the operation of the projector 11 has been described above. The processing along the flowchart of FIG. 22 is an example, and the operation of the projector 11 of the present example embodiment is not limited to the procedure as it is.

[Camera]

Figure 23:
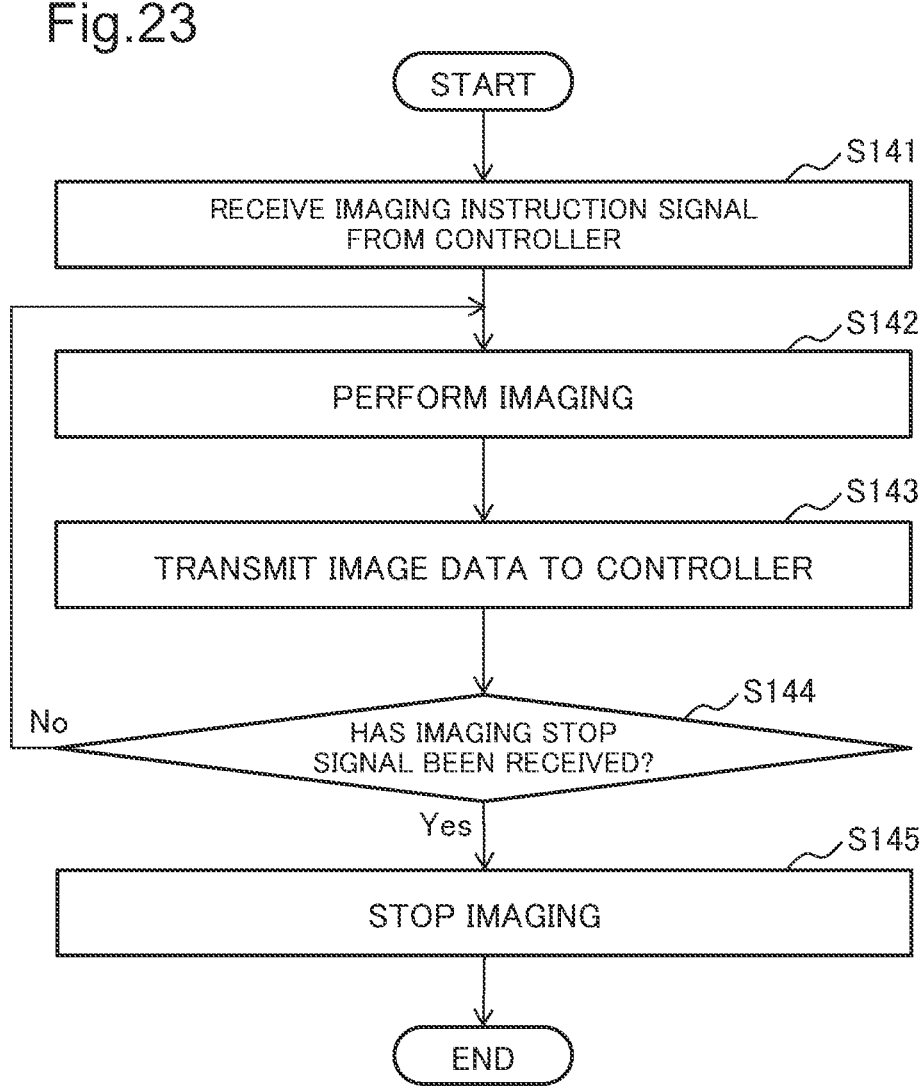
FIG. 23 is a flowchart for explaining an example of the operation of the camera included in the detection device included in the display system of the first example embodiment of the present invention.

FIG. 23 is a flowchart for explaining the operation of the camera 13. In the description along the flowchart of FIG. 23, the camera 13 will be described as main operation.

In FIG. 23, first, the camera 13 receives an imaging instruction signal from the controller 15 (step S141).

Next, the camera 13 images the imaging range according to the received imaging instruction signal (step S142).

Next, the camera 13 transmits the captured image data to the controller 15 (step S143).

When the imaging stop signal is received (Yes in step S144), the camera 13 stops imaging (step S145). On the other hand, when the imaging stop signal has not been received (No in step S144), the process returns to step S142.

An example of the operation of the camera 13 has been described above. The processing along the flowchart of FIG. 23 is an example, and the operation of the camera 13 of the present example embodiment is not limited to the procedure as it is.

[Application Example]

Here, an application example of the display system 1 of the present example embodiment will be described with reference to the drawings. In the work of searching for a desired book in a library, if a code (call number label) describing a title, a classification number, and the like of a book written on a spine of the book is read by image recognition, and light serving as a mark can be displayed at the position, workability is improved. However, in order to accurately read a title or a code of a book written on a spine of the book by image recognition from a distant position, a high-performance camera is required. A title of a book written on a spine of a book may be difficult to read due to aging, and may not be read even using image recognition. The present application example is an example of solving these problems.

Figure 24:
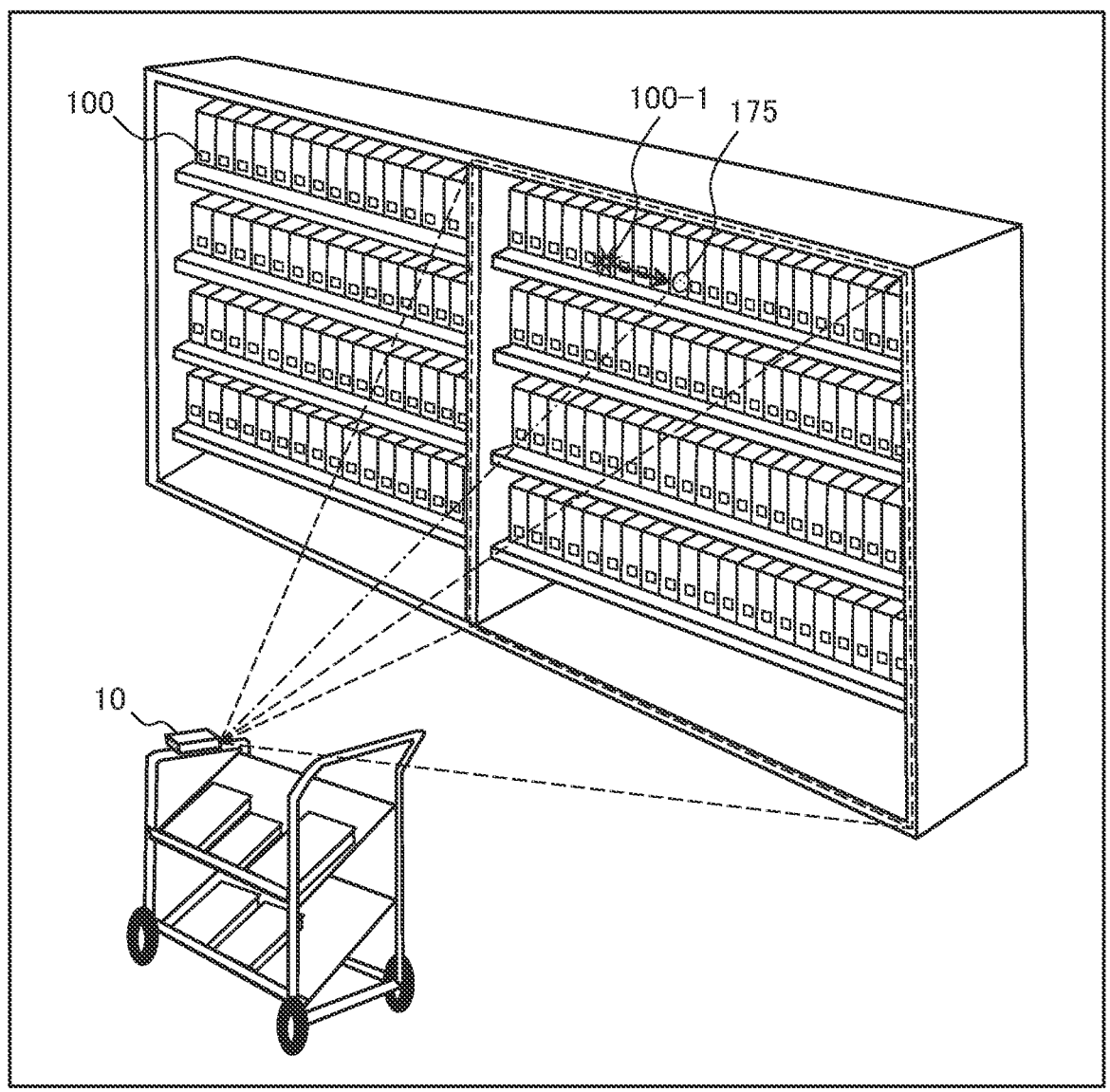
FIG. 24 is a conceptual diagram for explaining Application Example 1 of the display system of the first example embodiment of the present invention.
Figure 25:
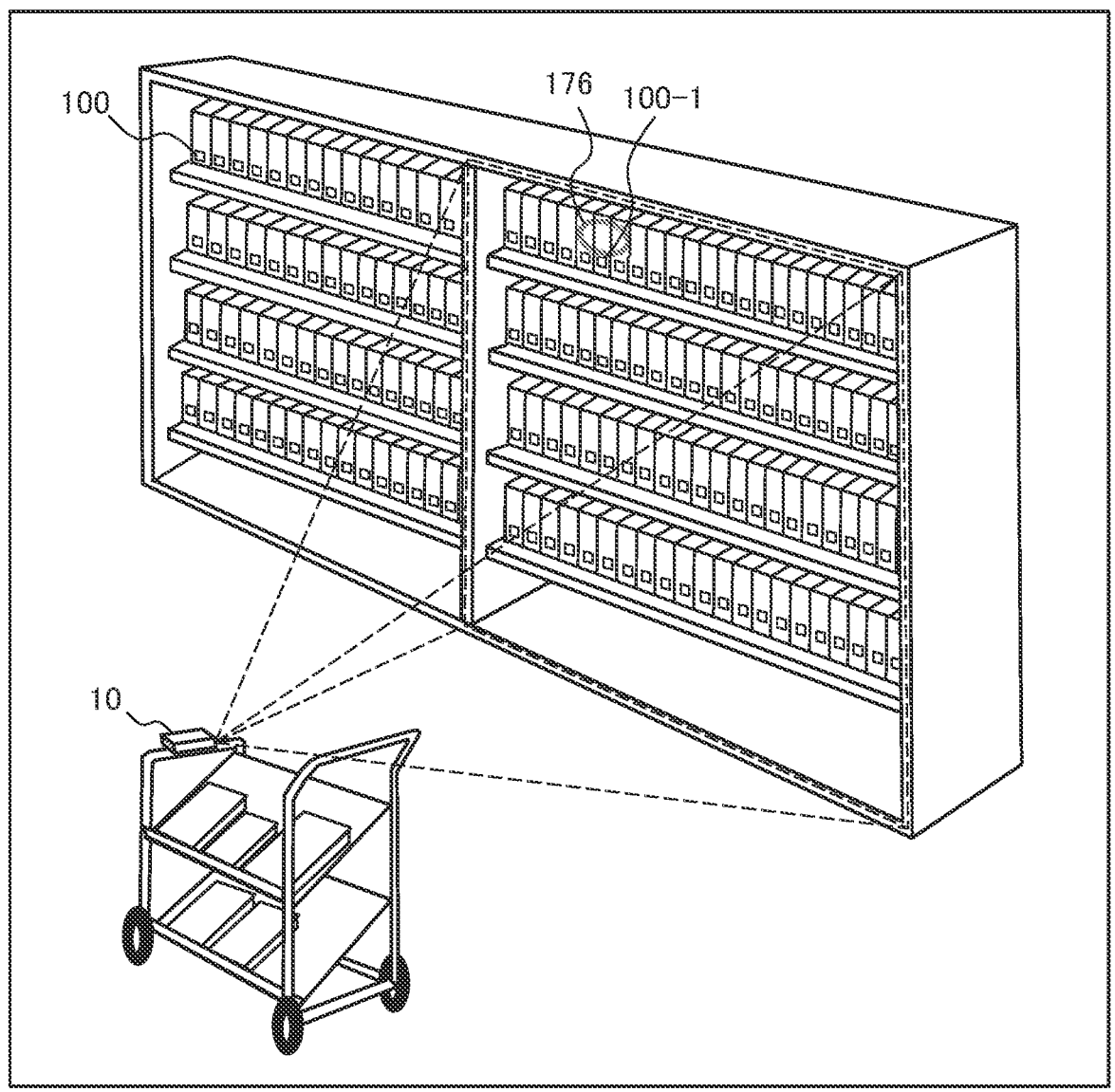
FIG. 25 is a conceptual diagram for explaining Application Example 1 of the display system of the first example embodiment of the present invention.

FIGS. 24 and 25 are conceptual diagrams for explaining Application Example 1 of the display system 1. Application Example 1 is an example in which a desired book is found from books arranged on a bookcase of a library, and marking light is displayed on a spine of the book.

FIG. 24 illustrates an example in which the scanning light 175 is projected toward the tag 100 attached to a spine of a book arranged on a bookcase of a library, and the scanning light 175 is sequentially scanned at the positions of the plurality of tags 100. FIG. 24 illustrates a state in which a tag 100-1 attached to a spine of a desired book emits light. FIG. 25 illustrates a state in which the marking light 176 is projected in a range including a book to which the light emitting tag 100-1 is attached. The user who has visually recognized the marking light 176 can find a desired book by visually recognizing the vicinity of the marking light 176. When the book is returned to the bookcase of the library, the return position of the book can be easily found by displaying the marking light near the return position.

Figure 26:
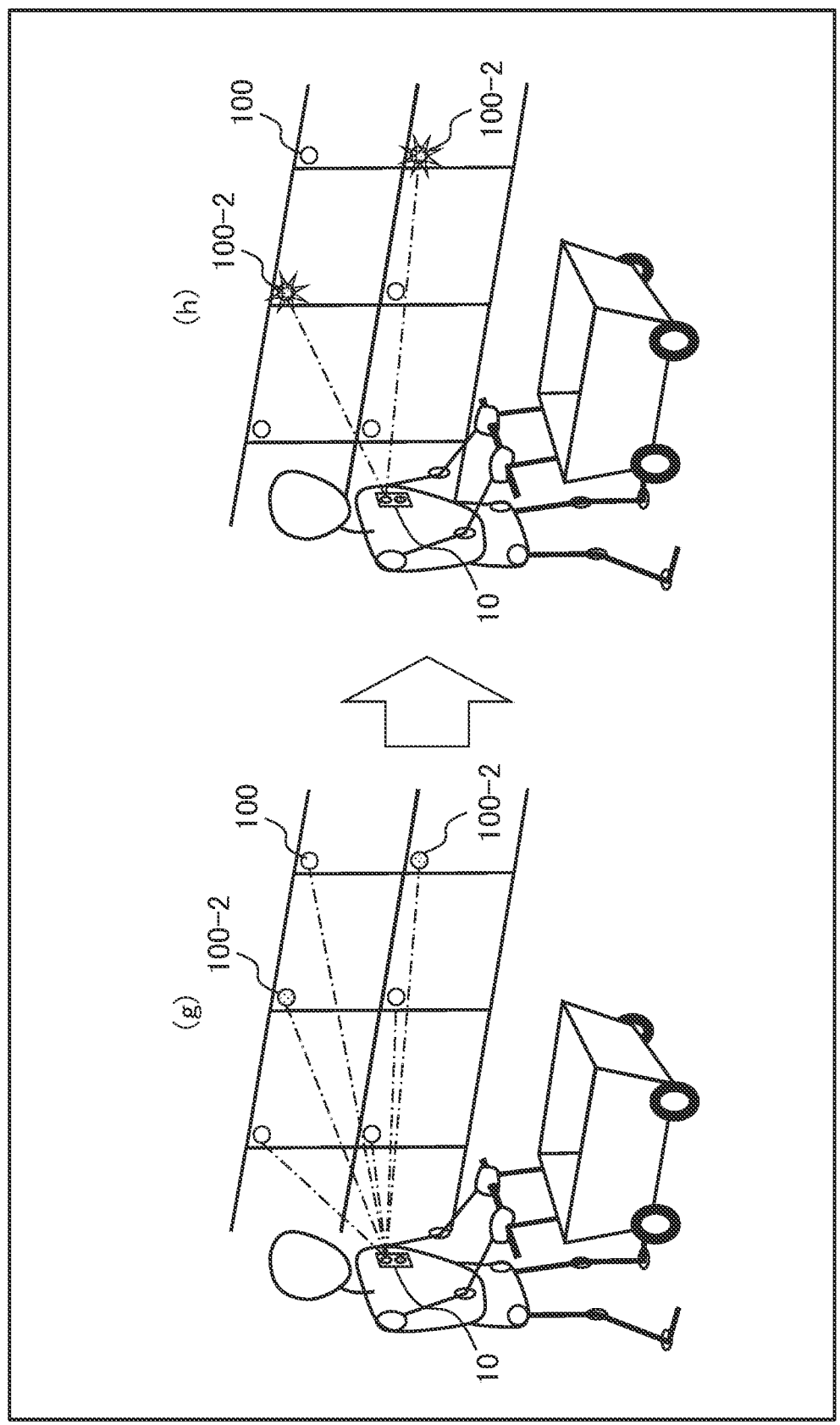
FIG. 26 is a conceptual diagram for explaining Application Example 2 of the display system of the first example embodiment of the present invention.

FIG. 26 is a conceptual diagram for explaining Application Example 2 of the display system 1. Application Example 2 is an example in which a desired locker is found out from a plurality of lockers by the detection device 10 worn on the chest of the worker, and the tag 100 attached to the locker continues to emit light.

(g) of FIG. 26 illustrates a state in which the detection device 10 worn on the chest of the worker detects the plurality of tags 100 and projects the scanning light on the tags 100. The detection device 10 detects the tag 100-2 emitting light from the tags 100 onto which the scanning light is projected. (h) of FIG. 26 illustrates a state in which scanning light is continuously projected onto the tag 100-2 that emits light and the tag 100-2 is caused to continuously emit light. For example, the position of the light emitting tag 100-2 may continue to be tracked using features extracted from image data captured by the camera 13.

Application Example 2 of FIG. 26 can also be applied to an application in which the plurality of tags 100 attached to a spine of a plurality of desired books arranged on a bookcase is caused to continuously emit light in a library. Although FIG. 26 illustrates an example in which the tag 100 continues to emit light, it is also possible to configure to project the marking light on an optional position based on a feature extracted from the image data.

Figure 27:
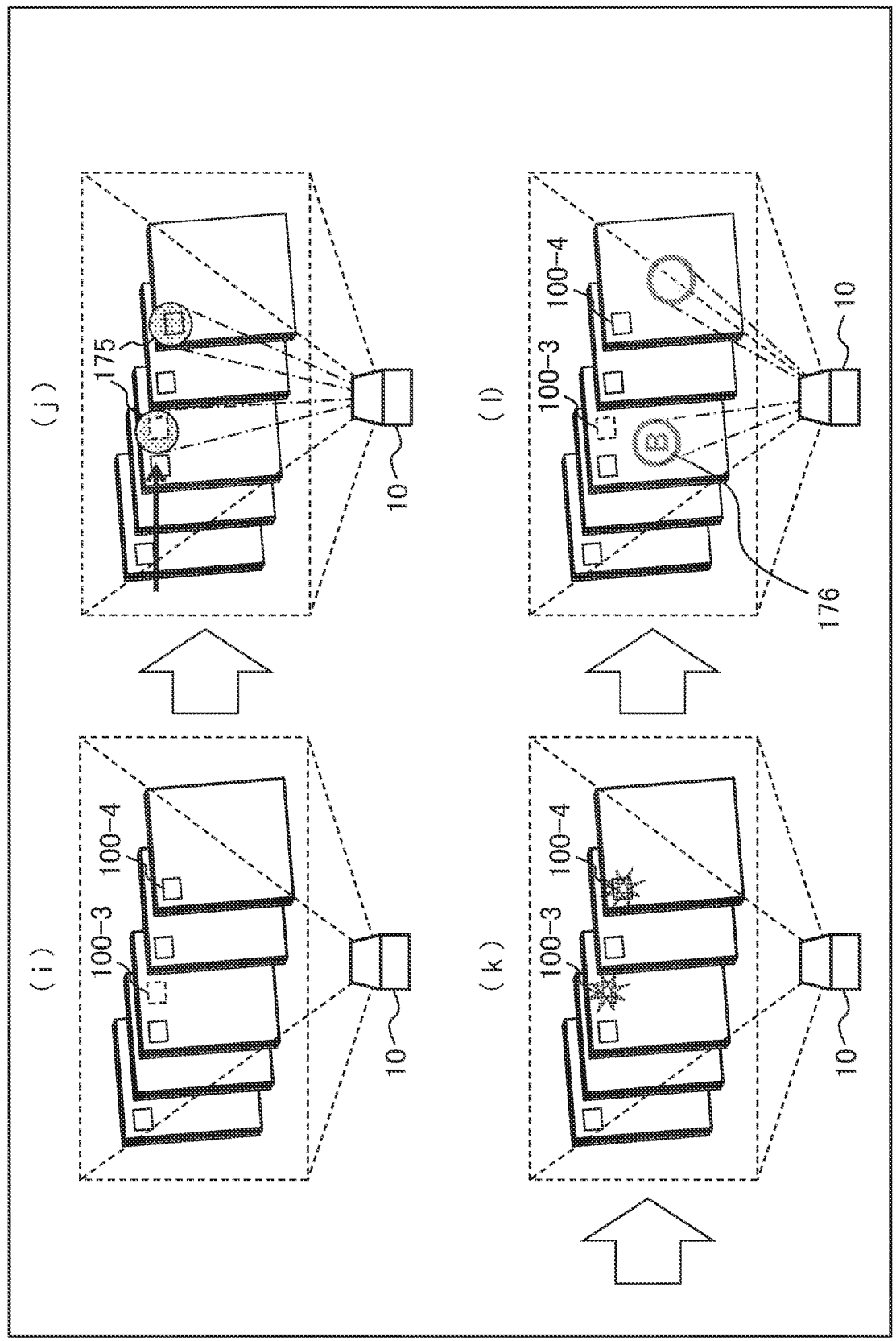
FIG. 27 is a conceptual diagram for explaining Application Example 3 of the display system of the first example embodiment of the present invention.

FIG. 27 is a conceptual diagram for explaining Application Example 3 in which a desired book is detected from a plurality of books arranged so as to overlap each other. FIG. 27 illustrates an example of detecting a book to which a tag 100-3 hidden behind the overlapped book is attached and a book to which a tag 100-4 is attached at a visible position.

(i) of FIG. 27 illustrates a state in which the detection device 10 images an imaging range surrounded by a rectangular broken line. FIG. 27(j) illustrates an example in which the scanning light 175 having a wavelength in the near-infrared region is scanned according to the position of the detected tag 100. In the example of FIG. 27(j), it is assumed that the scanning light is also projected on the tag 100-4 hidden behind the book. FIG. 27(k) illustrates a state in which the detection device 10 detects light emission of the tag 100-3 and the tag 100-4 passing through the books placed on the front surface in an overlapping manner. FIG. 27(1) illustrates a state in which the marking light 176 is displayed in a range including the book to which the light emitting tags 100-3 and 100-4 are attached. FIG. 27(1)

illustrates an example in which a code (B: Back) is displayed on the book overlapping in front of the book to which the hidden tag 100-3 is attached, so that the book behind the book is a desired book.

The display system 1 of the present example embodiment is not limited to the use of the Application Examples 1 to 3 of FIGS. 24 to 27, and can be used for any purpose as long as the purpose is to attach the tag 100 to each of a plurality of articles and to select a selected target from among the articles to which the tag 100 is attached. For example, the display system 1 of the present example embodiment can also be applied to an application in which the tag 100 is attached to products displayed in a store such as a supermarket, a convenience store, or a department store, and a desired product is selected from the products.

As described above, the display system of the present example embodiment includes a plurality of tags and a detection device. The plurality of tags store an identification code for identifying each tag, receive light including identification information to be compared with the identification code to generate electric power, and, when the identification information included in the received light matches the identification code, emit light using the tag's own electric power. The detection device generates image data by performing imaging according to input of identification information on a selected article. The detection device extracts at least one tag among the plurality of tags from the generated image data, and projects scanning light including identification information on a position of the extracted at least one tag. When light emission of one of a plurality of tags is detected from image data acquired in a period in which scanning light is projected, the detection device projects marking light on the periphery of the tag that has emitted light.

In one aspect of the present example embodiment, each of the plurality of tags includes a light detection element, a power storage element, and a tag controller. The light detection element receives the scanning light projected by the detection device and generates electric power by the received scanning light. The electric power generated by the light detection element is stored in the power storage element. The tag controller is started by electric power stored in the power storage element. The tag controller stores its own identification code, is started by the electric power stored in the power storage element, and compares the identification information included in the scanning light received by the light detection element with the identification code. For example, the light emitting element is any of a micro LED element, an organic EL element, and an inorganic EL element.

In an aspect of the present example embodiment, the detection device includes a controller, a camera, and a projector. The controller generates at least an imaging instruction signal and a projection condition for projecting the scanning light and the marking light according to the input to the identification information. The camera performs imaging according to an imaging instruction signal generated by the controller. The projector projects projection light on the basis of a projection condition generated by the controller.

In an aspect of the present example embodiment, the projector includes a light source, a phase modulation type spatial light modulator having a display surface that modulates and reflects emitted light emitted from the light source, and a projection optical system that projects reflected light reflected by the display surface of the spatial light modulator.

In an aspect of the present example embodiment, the controller outputs a projection condition of scanning light including a power supply signal for supplying electric power to the plurality of tags to the projector. The projector projects scanning light including the power supply signal on the basis of a projection condition from the controller.

In an aspect of the present example embodiment, the controller includes a reception unit, a control condition generation unit, an imaging generation unit, and a projection control unit. The reception unit receives the identification information. When the identification information is received, the control condition generation unit generates an imaging instruction signal for instructing the camera to perform imaging. The control condition generation unit generates a projection condition on the basis of image data obtained by imaging according to the imaging instruction signal. The control condition generation unit extracts at least one tag among the plurality of tags from the image data obtained by imaging according to the imaging instruction signal, and generates a projection condition for projecting the scanning light on the position of the extracted tag. When the light emission of the tag is detected from the image data acquired during the period in which the scanning light is projected, the control condition generation unit generates a projection condition for projecting the marking light on the position where the light emission of the tag is detected. The imaging generation unit transmits the imaging instruction signal generated by the control condition generation unit to the camera, and outputs image data captured by the camera according to the imaging instruction signal to the control condition generation unit. The projection control unit outputs the projection condition generated by the control condition generation unit to the projector.

In an aspect of the present example embodiment, when the feature of the tag is extracted from the image data, the control condition generation unit specifies the position of the tag on the basis of the feature of the tag, and generates the projection condition for projecting the scanning light on the specified position of the tag. When the light emission of the tag is detected from the image data acquired during the period in which the scanning light is projected, the control condition generation unit generates a projection condition for projecting the marking light on the periphery of the tag whose light emission is detected.

In an aspect of the present example embodiment, when the feature of the tag is extracted from the image data, the control condition generation unit continues to track the position of the tag on the basis of the feature of the tag detected from the image data generated by subsequent imaging. The control condition generation unit generates a projection condition for projecting the scanning light on the position of the tag being tracked.

The detection device of the present example embodiment projects scanning light including the identification information according to the input identification information. When receiving the scanning light, in a case where the identification information included in the scanning light matches the identification code stored in the tag itself, the tag of the present example embodiment causes the light emitting element to emit light. The detection device of the present example embodiment detects a tag that emits light according to scanning light, and projects marking light on the periphery of the tag. Therefore, according to the display system of the present example embodiment, it is possible to display a mark that makes it possible to quickly and precisely find a selected target.

Second Example Embodiment

Next, a display system according to a second example embodiment will be described with reference to the drawings. The display system of the present example embodiment has a simplified configuration of the display system of the first example embodiment.

Figure 28:
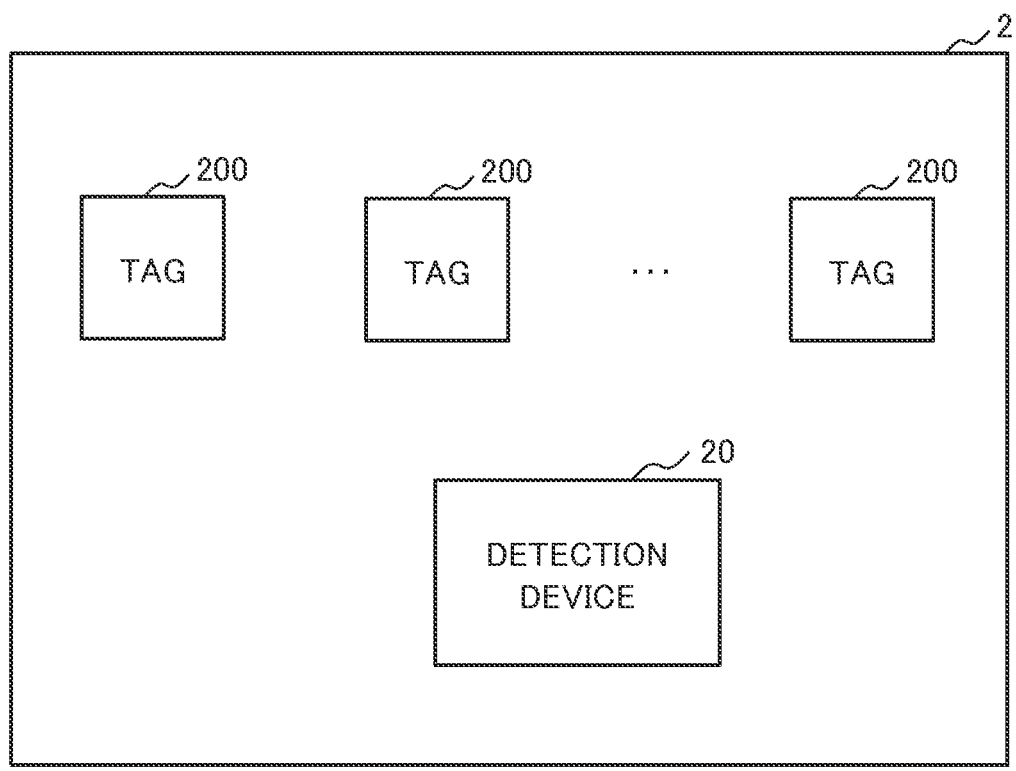
FIG. 28 is a block diagram illustrating an outline of a configuration of a display system according to a second example embodiment of the present invention.

FIG. 28 is a block diagram illustrating an example of a configuration of the display system 2 of the present example embodiment. The display system 2 includes a plurality of tags 200 and a detection device 20.

Each of the plurality of tags 200 stores an identification code for identifying each tag. Each of the plurality of tags 200 receives light including identification information to be compared with the identification code and generates electric power. Each of the plurality of tags 200 emits light using its own electric power when the identification information included in the received light matches the identification code.

The detection device 20 generates image data by performing imaging according to input of identification information on a selected article. The detection device 20 extracts at least one tag 200 among the plurality of tags 200 from the generated image data. The detection device 20 projects scanning light including identification information onto the position of at least one of the extracted tags 200. When light emission of one of a plurality of tags 200 is detected from image data acquired in a period in which scanning light is projected, the detection device 20 projects marking light on a range including the tag 200 that has emitted light.

As described above, the display system of the present example embodiment includes a plurality of tags and a detection device. Each of the plurality of tags stores an identification code for identifying each tag. Each of the plurality of tags receives light including identification information to be compared with the identification code and generates electric power. Each of the plurality of tags emits light using its own electric power when the identification information included in the received light matches the identification code. The detection device generates image data by performing imaging according to input of identification information on a selected article. The detection device extracts at least one tag among the plurality of tags from the generated image data. The detection device projects scanning light including identification information onto the position of at least one of the extracted tags. When light emission of one of a plurality of tags is detected from image data acquired in a period in which scanning light is projected, the detection device projects marking light on the periphery of the tag that has emitted light.

According to the display system of the present example embodiment, it is possible to display a mark that makes it possible to quickly and precisely find a selected target by quickly and precisely specifying a position of the selected target in image data.

(Hardware)

Here, a hardware configuration for achieving the controller 15 included in the display system 1 according to the first example embodiment of the present invention will be described with a control device 90 of FIG. 29 as an example. The control device 90 in FIG. 29 is a configuration example for achieving the controller 15, and does not limit the scope of the present invention.

Figure 29:
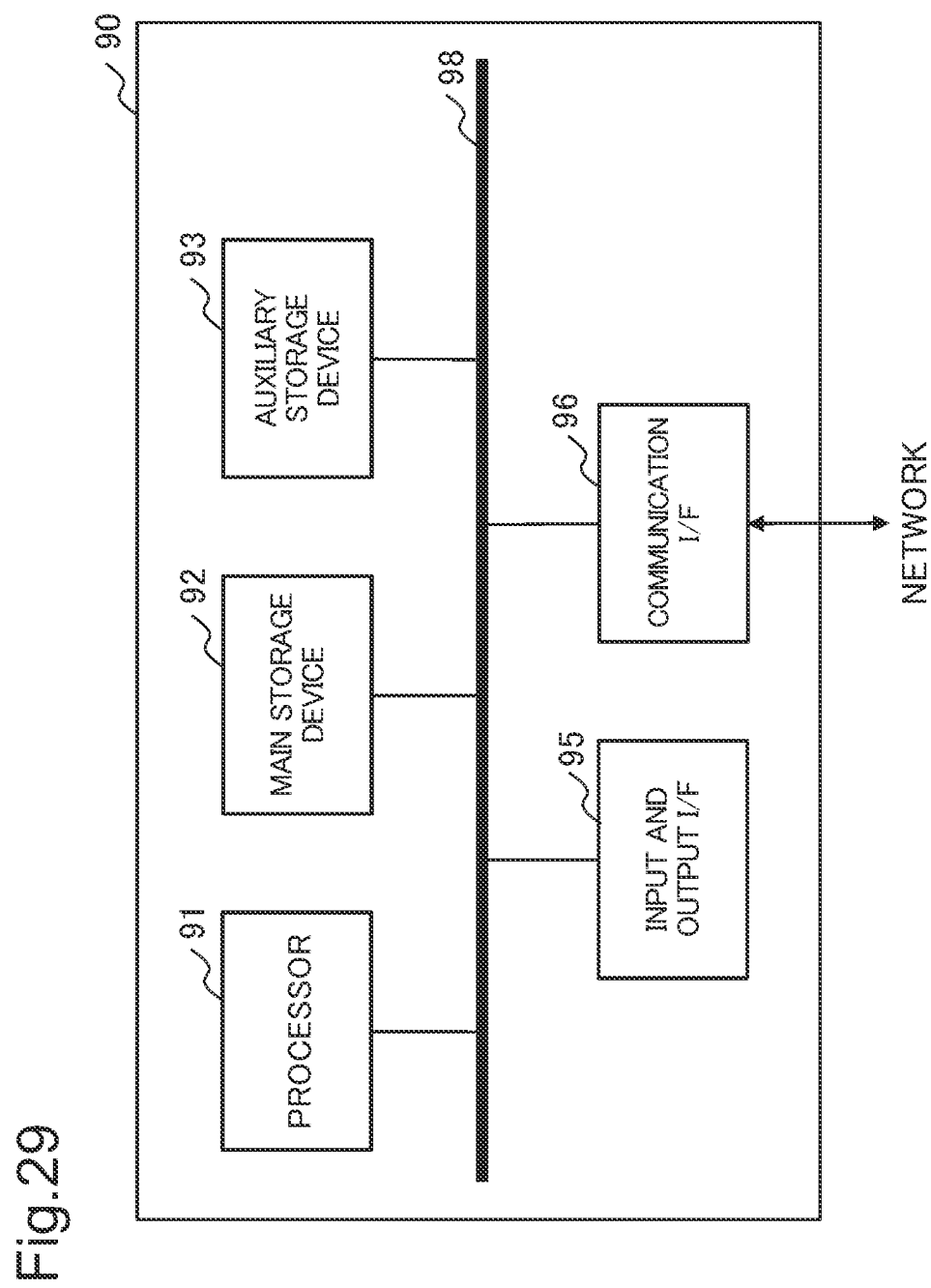
FIG. 29 is a conceptual diagram for explaining an example of a hardware configuration of a controller included in a detection device of a display system of each example embodiment of the present invention.

As illustrated in FIG. 29, the control device 90 includes a processor 91, a main storage device 92, an auxiliary storage device 93, an input and output interface 95, and a communication interface 96. In FIG. 29, the interface is abbreviated as I/F. The processor 91, the main storage device 92, the auxiliary storage device 93, the input and output interface 95, and the communication interface 96 are data-communicably connected to each other via a bus 98. The processor 91, the main storage device 92, the auxiliary storage device 93, and the input and output interface 95 are connected to a network such as the Internet or an intranet via the communication interface 96.

The processor 91 develops the program stored in the auxiliary storage device 93 or the like in the main storage device 92 and performs the developed program. In the present example embodiment, it is sufficient that a software program installed in the control device 90 is used. The processor 91 performs processing by the controller 15.

The main storage device 92 has a region in which a program is developed. The main storage device 92 may be a volatile memory such as a dynamic random access memory (DRAM). A nonvolatile memory such as a magnetoresistive random access memory (MRAM) may be configured and added as the main storage device 92.

The auxiliary storage device 93 stores various data. The auxiliary storage device 93 includes a local disk such as a hard disk or a flash memory. Various data may be stored in the main storage device 92, and the auxiliary storage device 93 may be omitted.

The input and output interface 95 is an interface for connecting the control device 90 and a peripheral device. The communication interface 96 is an interface for connecting to an external system or device through a network such as the Internet or an intranet on the basis of a standard or a specification. The input and output interface 95 and the communication interface 96 may be shared as an interface connected to an external device.

An input device 17 such as a keyboard, a mouse, and a touch panel is connected to the control device 90. The input device 17 is used to input information such as identification information about a selection article, a storage article, or the like, and various settings. When a touch panel is used as the input device 17, it is sufficient that the display screen of the touch panel also serves as an interface of the input device 17. It is sufficient that data communication between the processor 91 and the input device 17 is mediated by the input and output interface 95.

The control device 90 may be provided with a display device for displaying information. When a display device is provided, the control device 90 preferably includes a display control device (not illustrated) for controlling display of the display device. The display device may be connected to the control device 90 via the input and output interface 95.

The above is an example of a hardware configuration for enabling the controller 15 included in the display system 1 according to the first example embodiment. The hardware configuration of FIG. 29 is an example of a hardware configuration for performing processing by the controller 15, and does not limit the scope of the present invention. A program for causing a computer to execute processing related to the controller 15 is also included in the scope of the present invention. A program recording medium in which a program executed by the controller 15 is recorded is also included in the scope of the present invention.

The program recording medium can be achieved by, for example, an optical recording medium such as a compact disc (CD) or a digital versatile disc (DVD). The program recording medium may be achieved by a semiconductor recording medium such as a universal serial bus (USB)

memory or a secure digital (SD) card, a magnetic recording medium such as a flexible disk, or another recording medium.

The components of the controller 15 can be arbitrarily combined. The components of the controller 15 may be achieved by software or may be achieved by a circuit.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent application No. 2019 127564 filed on Jul. 9, 2019, the disclosure of which is incorporated herein in its entirety by reference.

REFERENCE SIGNS LIST 1 display system
10 detection device
11 projector
13 camera
15 controller
17 input device
100 tag
101 light detection element
103 power storage element
105 tag controller
107 light emitting element
111 light emitter
112 light source
113 collimator
115 spatial light modulator
117 projection optical system
131 imaging element
133 image processing processor
135 internal memory
137 data output circuit
151 reception unit
152 control condition generation unit
153 storage unit
155 imaging control unit
156 projection control unit
1521 identification information reception unit
1522 image data acquisition unit
1523 tag extraction unit
1525 identification code acquisition unit
1526 projection condition generation unit
1531 identification code storage unit
1533 projection information storage unit

What is claimed is:

1. A display system comprising:
a plurality of tags that each stores an identification code for identifying that tag, generates electric power upon receiving light that contains identification information to be compared with the identification code, and emits light using the electric power of that tag when the identification information contained in the received light matches the identification code; and
a detection device that performs imaging and generates image data in accordance with an input of the identification information on a selected article, extracts at least one tag among the plurality of tags from the image data that has been generated, projects scanning light that contains the identification information on a position of the at least one tag that has been extracted, and, when emitted light from any of the plurality of tags is detected from the image data acquired during a period in which the scanning light is projected, projects marking light on the periphery of the tag that has emitted light.

2. The display system according to claim 1,
wherein each of the plurality of tags includes:
a light detection element that receives the scanning light projected by the detection device and generates electric power by the scanning light that has been received;
a power storage element that stores electric power generated by the light detection element;
a tag controller that stores the identification code of the tag controller, is started by the electric power stored in the power storage element, and compares the identification information included in the scanning light received by the light detection element with the identification code; and
a light emitting element that emits light by the electric power supplied from the tag controller, and
wherein the tag controller is configured to,
when the identification information matches the identification code, supply the electric power for causing the light emitting element to emit light to the light emitting element.

3. The display system according to claim 2, wherein the light emitting element is
any one of a micro light emitting diode (LED) element, an organic electro-luminescence (EL) element, and an inorganic electro-luminescence (EL) element.

4. The display system according to claim 1, wherein the detection device includes:
a controller that generates at least an imaging instruction signal and a projection condition for projecting the scanning light and the marking light according to an input to the identification information;
a camera that performs imaging according to the imaging instruction signal generated by the controller; and
a projector that projects projection light based on the projection condition generated by the controller.

5. The display system according to claim 4, wherein the projector includes a projection device including:
a light source;
a phase modulating spatial light modulator having a display surface that modulates and reflects emitted light emitted from the light source; and
a projection optical system that projects reflected light reflected by the display surface of the phase modulating spatial light modulator.

6. The display system according to claim 4, wherein the controller
outputs the projection condition of the scanning light including a power supply signal for supplying electric power to the plurality of tags to the projector, and
wherein the projector
projects the scanning light including the power supply signal based on the projection condition from the controller.

7. The display system according to claim 4,
wherein the controller includes:
at least one memory storing instructions; and
at least one processor connected to the at least one memory and configured to execute the instructions to
receive the identification information,
when the identification information is received, generate the imaging instruction signal for instructing the camera to perform imaging, and generate the projection condition based on the image data obtained by imaging according to the imaging instruction signal, transmit the imaging instruction signal that had been generated to the camera, acquire the image data captured by the camera according to the imaging instruction signal, output the projection condition that had been generated to the projector, extract at least one tag among the plurality of tags from the image data obtained by imaging according to the imaging instruction signal, generate the projection condition for projecting the scanning light on a position of the tag that has been extracted, and, when light emission of the tag is detected from the image data acquired during the period in which the scanning light is projected, generate the projection condition for projecting the marking light on the position where the light emission of the tag is detected.

8. The display system according to claim 7, wherein the at least one processor is configured to execute the instructions to, when a feature of the tag is extracted from the image data, specify a position of the tag based on the feature of the tag, and generate the projection condition for projecting the scanning light on the position of the tag that has been specified, and, when the light emission of the tag is detected from the image data acquired during the period in which the scanning light is projected, generate the projection condition for projecting the marking light on the periphery of the tag whose light emission has been detected.

9. The display system according to claim 7, wherein the at least one processor is configured to execute the instructions to, when a feature of the tag is extracted from the image data, continue to track the position of the tag based on the feature of the tag extracted from the image data generated by subsequent imaging, and generate the projection condition for projecting the scanning light on the position of the tag being tracked.

10. A display method of displaying marking light around a plurality of tags, each of the tags being configured to store an identification code for identifying that tag, generate electric power upon receiving light that contains identification information to be compared with the identification code, and emit light using the electric power of that tag when the identification information contained in the received light matches the identification code, the method comprising:

performing imaging and generating image data in accordance with an input of the identification information on a selected article;

extracting at least one tag among the plurality of tags from the image data that has been generated;

projecting scanning light that contains the identification information on a position of the at least one tag that has been extracted; and, when emitted light from any of the plurality of tags is detected from the image data acquired during a period in which the scanning light is projected, projecting the marking light on the periphery of the tag that has emitted light.

* * * * *